United States Patent
Roden et al.

(10) Patent No.: US 6,412,077 B1
(45) Date of Patent: Jun. 25, 2002

(54) DISCONNECT POLICY FOR DISTRIBUTED COMPUTING SYSTEMS

(75) Inventors: Thomas Anthony Roden, Irvine; John Knight, Lake Forest; David Cates, Yorba Linda, all of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/231,920

(22) Filed: Jan. 14, 1999

(51) Int. Cl.[7] .............................................. G06F 11/00
(52) U.S. Cl. .......................................................... 714/4
(58) Field of Search ........................ 714/4, 43; 709/229, 709/239

(56) References Cited

U.S. PATENT DOCUMENTS

| | | | | |
|---|---|---|---|---|
| 5,586,260 A | * | 12/1996 | Hu ................................ | 713/201 |
| 5,752,041 A | | 5/1998 | Fosdick ........................ | 395/712 |
| 5,898,780 A | | 4/1999 | Liu et al. ...................... | 380/25 |
| 5,918,019 A | | 6/1999 | Valencia ................. | 395/200.57 |
| 6,011,910 A | * | 1/2000 | Chau ............................ | 709/229 |
| 6,032,260 A | | 2/2000 | Sasmazel et al. ........... | 713/202 |
| 6,058,378 A | | 5/2000 | Clark et al. .................... | 705/37 |
| 6,070,243 A | | 5/2000 | See et al. ..................... | 713/201 |
| 6,073,176 A | * | 6/2000 | Baindur ........................ | 709/227 |
| 6,088,451 A | * | 7/2000 | He ............................... | 380/25 |
| 6,092,196 A | | 7/2000 | Reiche ......................... | 713/200 |
| 6,101,616 A | * | 8/2000 | Joubert ......................... | 714/11 |
| 6,105,069 A | | 8/2000 | Fanklin et al. ............... | 709/229 |
| 6,112,305 A | * | 8/2000 | Danes .......................... | 713/156 |
| 6,119,160 A | * | 9/2000 | Zhang .......................... | 709/224 |
| 6,144,959 A | | 11/2000 | Anderson et al. ............... | 707/9 |
| 6,151,628 A | * | 11/2000 | Xu ............................... | 709/225 |
| 6,230,281 B1 | * | 5/2001 | Brodfuhrer .................... | 714/4 |
| 6,249,811 B1 | | 6/2001 | Kido ........................... | 709/219 |

* cited by examiner

Primary Examiner—Robert Beausoleil
Assistant Examiner—Bryce P. Bonzo
(74) Attorney, Agent, or Firm—Hickman Palermo Truong & Becker LLP; Christopher J. Palermo

(57) ABSTRACT

A mechanism for performing a disconnect policy involving authorizing a data communication session between a client and a first server is disclosed. The mechanism provides a failover scheme in which local servers record the number of active sessions that they have authorized for a particular user entity. Each user entity is assigned an authoritative server. The authoritative servers maintain global session information for each user entity in which they are assigned. When a local server cannot authorize a session for a particular user entity the local server communicates with the authoritative server to determine whether a session should be established for the user entity. If communication is lost between a local server and an authoritative server, the local server assumes that no other servers have authorized active sessions for the particular user entity. In a similar manner, the authoritative server assumes that the local server has not authorized any active sessions for the particular entity. Thus, both the local server and the authoritative server may independently authorize sessions for the user entity.

When communication is re-established between the local server and the authoritative server, the servers exchange information to recreate the current state. If it is determined that too many active sessions have been established for user entity, further authorization requests from the user entity are denied until the number of active sessions is reduced below an acceptable level. This, failover scheme removes the need for redundant servers and instead distributes the burden of redundancy to the local servers where communication problems are far less likely to occur.

24 Claims, 17 Drawing Sheets

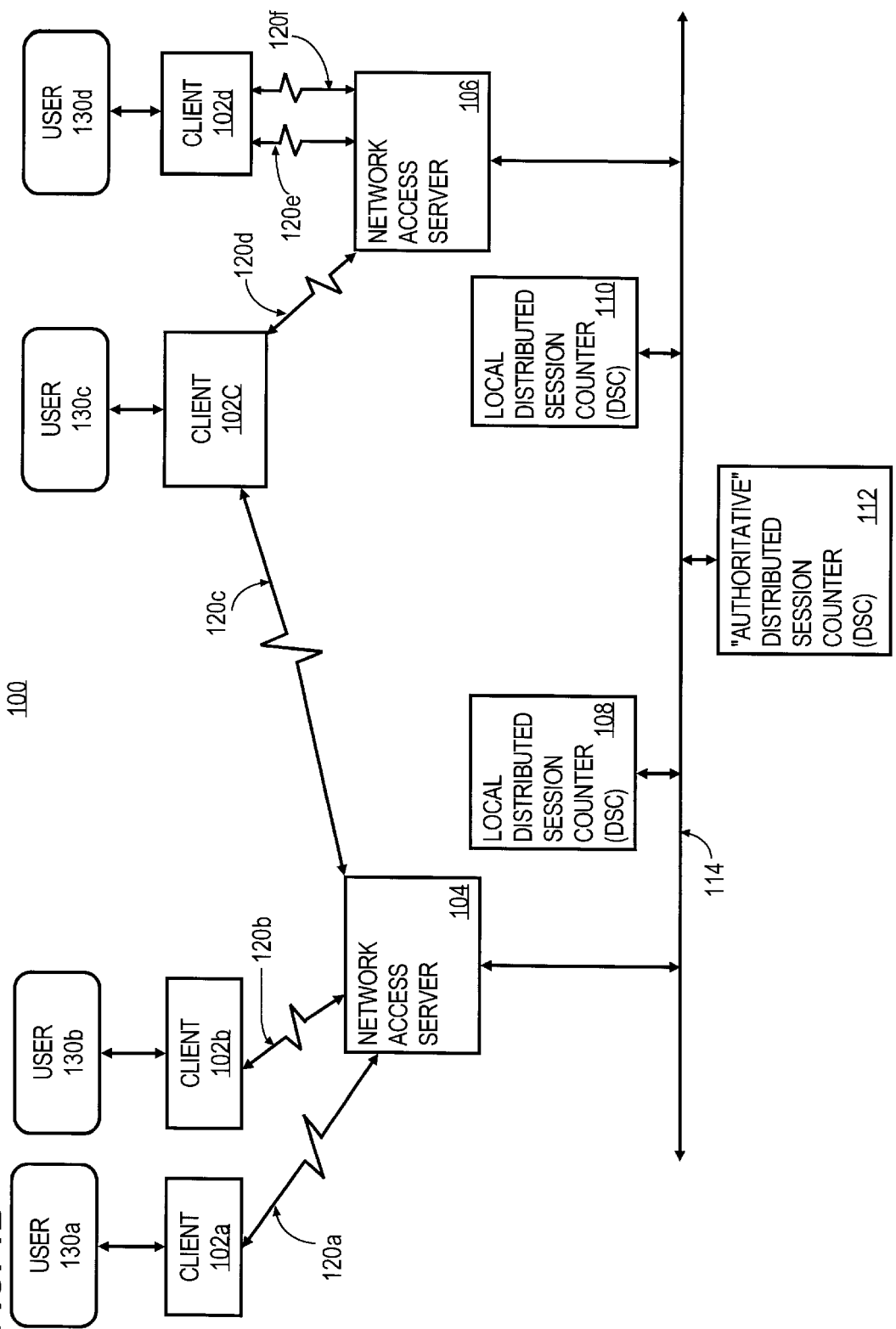

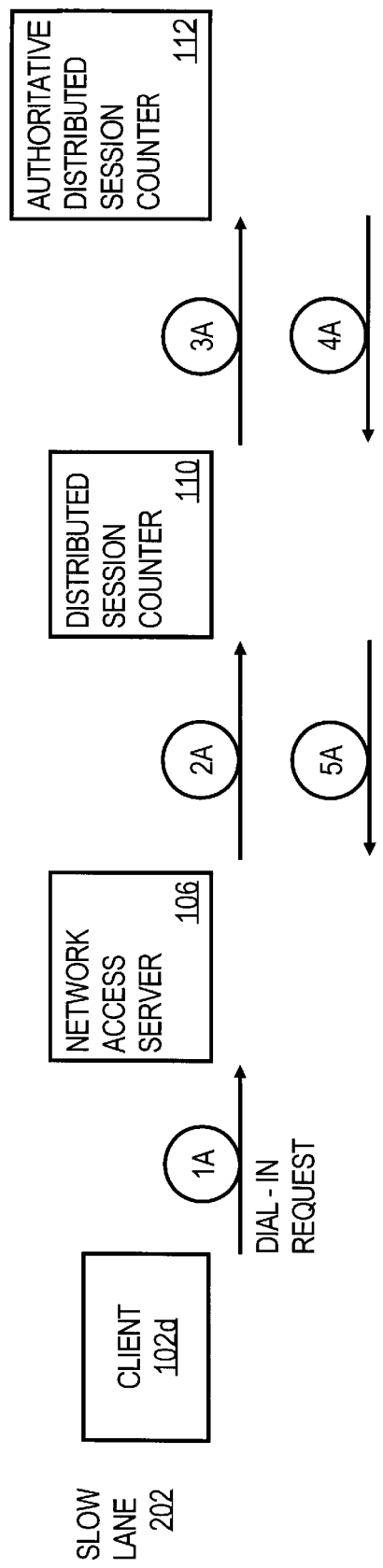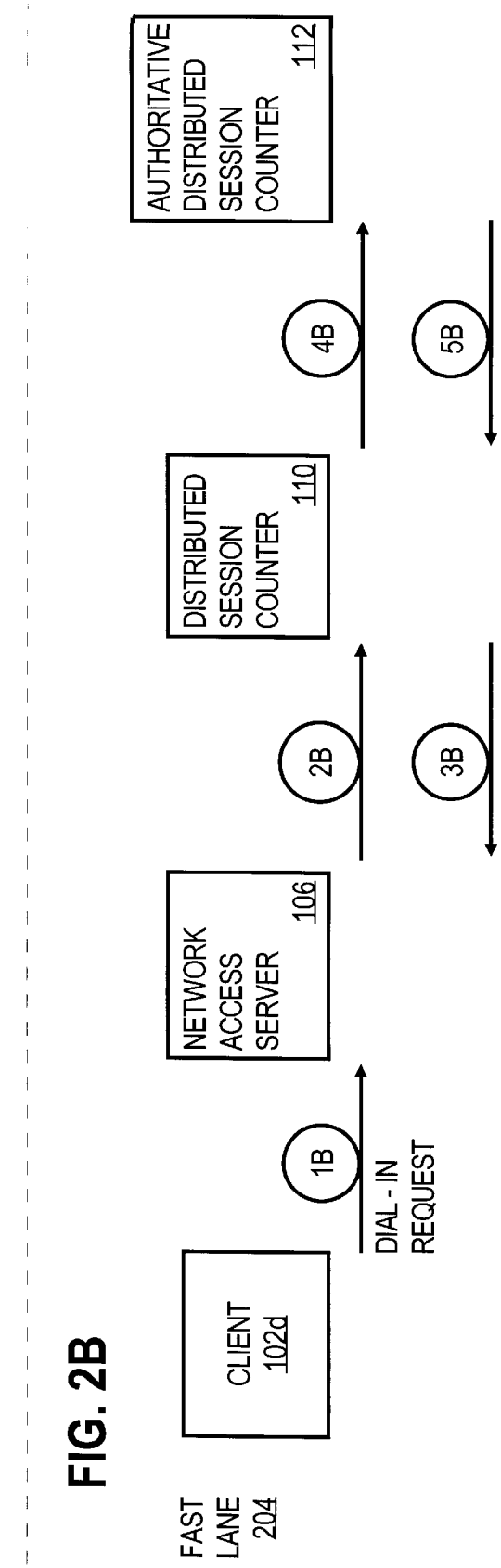

DISCONNECT POLICY FOR DISTRIBUTED COMPUTING SYSTEMS

COPYRIGHT AUTHORIZATION

A portion of the disclosure of this patent document contains material which is subject to copyright protection. The copyright owner has no objection to the facsimile reproduction by any one of the patent disclosures, as it appears in the U.S. Patent & Trademark Office patent files or records, but otherwise reserves all copyright rights whatsoever.

FIELD OF THE INVENTION

The present invention generally relates to distributed computing systems, and more specifically relates to performing a disconnect policy in a distributed computing system.

BACKGROUND OF THE INVENTION

A distributed computing system is a system having resources that are physically distributed among different locations. In general, the resources that make up a distributed computing system include information and data, which may be in many forms and formats, and various hardware and software components that are used to access, manage, manipulate and process the information and data.

One approach to implementing a distributed computing system is through the use of a network system. In general, a network system is a collection of computers and other peripheral devices that are connected in a manner that enables them to communicate with each other. The computers and other peripheral devices typically include software and hardware components that allow information and data to be distributed throughout the network.

Many network systems provide mechanisms that allow them to be remotely accessed. By allowing remote access, individuals can connect to the network system to access resources and obtain information while being located at a remote site.

A popular method of providing remote access to a network is through the use of a dial-in network access server (NAS) that controls access to the network. For example, model AS5300, commercially available from Cisco Systems Inc., can be used to provide dial-in access to a network system. Individuals can access the network system by dialing into the network access server from a Remote Node to establish a connection. In this document, the term Remote Node refers to any client device, such as a personal computer (PC) or router, that can be used to dial in and establish a connection with a network access server. A client/server relationship exists between the Remote Node and the network access server.

For example, many home and office computers are equipped or have access to a modem that can be used to establish a dial-in connection with a NAS. These dial-in connections may be made using one of the Internet's standard dial-in protocols, either the Point-to-Point Protocol (PPP) or the Serial Line Internet Protocol (SLIP). To establish a connection with a particular NAS, a user interacts with the computer to cause a modem to dial into the particular NAS. As part of the dial in process, identification information, such as a user name and password, is provided to the NAS. The NAS validates the login information, and if it is valid, the NAS establishes a "session" for the particular user. In this context, a session is a specific connection that has been established for a particular user between a Remote Node and a server and which provides access to a network system. Thus, once a session is established, the user can access resources and obtain information that is associated with the network system.

In general, it is important to be able to control and monitor the users or group of users that are able to login and establish a session with an NAS. For example, Internet Service Providers (ISPs) allow customers to log in and establish sessions with an NAS in order to obtain access to resources that are available on the Internet. Several ISPs and "Online Services," such as America Online® and CompuServe®, also provide their customers with access to proprietary information (such as proprietary databases and forums) and other online services that are available through their NAS connections. For providing access to these resources, the ISPs and Online Services charge their customers a connection fee that may be on an hourly connection or monthly flat lee basis. Thus because their revenue is dependent on the fees that are paid by their customers, the ISPs and Online Services need to monitor and control the users or group of users who are able to log in and establish a session with one of their NASs.

To reduce loads and better serve their customers, the ISPs and Online Services may provide a large number of NASs to which customers can dial in to establish a session . In addition, because their customers may not be confined to particular region, many ISPs and Online Services have distributed their NASs throughout the world. A benefit of distributing the NASs is that a significant number of customers are able dial in and establish a session by a local call. Thus, the customers are not required to make long distance calls to establish a session with a NAS, nor are the ISPs and Online Services required to provide an "800" number in order to reduce their customer's connection costs.

However, a drawback of providing multiple NASs for connecting to a network is that it can be difficult to control actual the number of sessions that are to be allowed for a particular user or group of users. One method of controlling the number of sessions that a particular user or group of users can establish is by maintaining a global count as to the total number of sessions that are currently active for a particular user or group of users. For example, by designating a particular NAS as the Central Authenticator, a global count of the total number of sessions that are currently established for a particular user or group of users can be maintained. Thus, before a NAS can establish a session for a particular user or group of users, it must first communicate with the Central Authenticator to determine whether the total number of allocated sessions have already been established for the particular user or group of users. If the Central Authenticator determines that the total number of allocated sessions have already been established for the particular user or group of users, then the connection request is denied. Alternatively, if Central Authenticator determines that the total number of allocated sessions have not yet been established, then the connection request is granted.

However, always having to communicate with a Central Authenticator to determine whether a connection request should be granted has a drawback, namely that if the Central Authenticator crashes or communication to the Central Authenticator is lost, a user or group of users may be denied a session even though the total number of allocated sessions have not yet been established ("under-subscription").

For example, a company "A", which has employees located in five ("5") cities (San Diego, Los Angeles, San Jose, San Francisco and Irvine) may have a total of one hundred ("100") sessions allocated for its employees, but may have only twenty-five ("25"sessions that are currently active. By locating a NAS in each of the five cities, the employees of company "A" can dial into a local NAS to request a session. Upon receiving the request, the NAS may communicate with the Central Authenticator to verify that a session can be established for the employee. However, if the Central Authenticator has crashed or the communication link between the local NAS and the Central Authenticator has failed, there is no way to determine that a session should be established for the particular employee. Thus, the session request cannot be granted and the employee will be denied access to the network, even though the total number of sessions that are active for the employees of company "A" ("25") is less than the total number of allocated sessions ("100") ("under-subscription"). In this context, a communication link failure includes but is not limited to any type of hardware or software failure that impedes or obstructs two components from communicating with one another.

One approach to avoiding under-subscription is to implement a "hot" backup system in which a backup Central Authenticator is used to mirror the primary Central Authenticator. Thus, whenever the primary Central Authenticator becomes unavailable, a NAS may communicate with the backup Central Authenticator to obtain authorization for establishing a session.

However, a significant drawback with a "hot" backup system is that it can require a substantial amount of additional hardware and may require a significant increase in the complexity of the communication logic. The additional hardware components and added communication logic can significantly increase the cost of the system. For example to implement a hot backup system, a second Central Authenticator (backup) is needed. This in itself can significantly increase the cost of the system.

In addition, in order to integrate the backup Central Authenticator into the system, each NAS needs additional communication links to communicate with the backup Central Authenticator in case of a failure. Thus, additional hardware and communication logic will also need to be added to each NAS. Further, the added communication links can potentially reduce the reliability of the system as the added links are just as likely to go down as the communication links to the primary Central Authenticator. Furthermore, additional logic will need to be added to the primary and backup Central Authenticators to keep them synchronized.

Another approach to reducing under-subscription is to enable each NAS to establish the total number of sessions that have been allocated for a user of group of users. Thus, if a particular NAS crashes, the other NASs can still authorize up to the maximum number of sessions that have been allocated. In addition, if the communication link between two NASs goes down, authorization of sessions is not affected.

For example, the NASs that are located in each of the five cities (San Diego, Los Angeles, San Jose, San Francisco and Irvine) may each be allowed to authorize and actively establish one hundred ("100") sessions for the employees of company "A". By having each local NAS maintain its own counter of the number of sessions that are currently active for the employees of company "A", the NASs need not communicate with a Central Authenticator before a session can be authorized. Thus, if the San Jose NAS crashes, the other NASs are not affected, as they may still authorize the total number of sessions that are allocated for the employees of company "A". Also, if a communication link between the San Jose NAS and the Irvine NAS goes down, the San Jose NAS and the Irvine NAS may each still authorize the total number of sessions.

However, providing each NAS with the ability to establish the total number of sessions that have been allocated for a particular user of group of users has a drawback. A number of sessions may be actively established for the particular user or group of users that is greater than is actually allocated ("over-subscription"). For example, the employees of company "A", who are located throughout the five cities may require that a total of 100 sessions be allocated for use. If a NAS is located in each of the 5 cities, and each NAS allows a total of 100 sessions to be established by the employees of company "A", then a total of 500 sessions may actively be established by the employees of company "A" (five NASx100 sessions per NAS). Thus, by providing each NAS with the ability to authorize the total number of sessions that are allocated for company "A", a large number of unauthorized sessions may be established (400 in this example). These unauthorized sessions potentially represent a significant amount of unrealized revenue. In addition, because only a limited number of connections can be made with any one NAS, allowing a large number of unauthorized sessions to be established can significantly reduce the number of authorized sessions that can be established at one time.

Based on the foregoing, there is a clear need for a recovery mechanism that does not require the use of backup servers or redundant servers.

There is also a need for a recovery mechanism that can reduce the number of times that a particular user or group of users are denied a session, even though the system has not yet established the total number of active sessions that have been allocated to the particular user or group of users.

In addition, there is also a need for a recovery mechanism that can reduce the number of unauthorized sessions that arc allowed for a particular user or group of users.

SUMMARY OF THE INVENTION

The foregoing needs, and other needs and objects that will become apparent from the following description, are achieved in the present invention, which comprises, in one aspect, a method for dealing with and recovering from failures in a distributed database system. The method may comprise determining that a second server cannot communicate with a third server that is normally responsible for authorizing the session. A request is received to establish a session for a particular entity associated with the client. It is determined whether the third server is an authoritative server for the entity. If the third server is the authoritative server for the entity, then it is determined at the second server whether the session should be established for the entity.

One feature of this aspect is that if the second server determines that the session should be established, then the first server is informed that the session may be established between the client and the first server.

Another feature of this aspect is that if the second server determines that the session should not be established, then the first server is informed that the session may not be established between the client and the first server.

Still another feature of this aspect includes the steps of storing and maintaining data that is associated with the second server. The data includes a local session established counter value that indicates a first number obsessions that have been authorized for the particular entity by the second server and which are still currently active, and an allocated sessions threshold value that indicates a second number of sessions that have been allocated for the particular entity.

Yet another feature of this aspect includes the steps of storing and maintaining data that is associated with the second server. The data includes, a local session counter value that indicates a third number of sessions that are currently active for the particular entity, and a local session threshold value that indicates a fourth number of sessions that may be currently active before sessions cannot be authorized locally by the second server.

According to another feature a method is provided for authorizing a data communication session between a client and a first server. After a failure, the method determines that a second server and a third server cannot communicate. One or more sessions that were authorized by the second server and which are currently active for a particular entity are identified. The third server is assigned as an authoritative server for the particular entity. A global session counter value that indicates a first number of sessions that are currently active for the particular entity is calculated. The global session counter value does not include the one or more sessions that have been authorized by the second server and which are currently active for the particular entity. Upon receiving a request to authorize a session for the particular entity the method determines whether the session should be established by comparing the global session counter value with a global session threshold value. The global session threshold indicates a second number of sessions that have been allocated for the particular entity.

According to yet another feature, a method for broadcasting session information to one or more servers is provided, comprising the computer-implemented steps of determining, after a failure, that a first server cannot communicate with a second server. One or more sessions that were authorized by the second server and which are currently active for a particular entity are identified. The first server is assigned as an authoritative server for the particular entity. A global session counter value that indicates a first number of sessions that are currently active for the particular entity is calculated. The global session counter value does not include the one or more sessions that have been authorized by the second server and which are currently active for the particular entity. The method determines whether one or more other servers have previously authorized sessions for the particular entity; and if one or more other servers have previously authorized sessions for the particular entity, then the one or more other servers are informed of the calculated global session counter value.

The invention also encompasses a computer-readable medium, a computer data signal embodied in a carrier wave, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram of another computer system architecture in which the present invention may be utilized;

FIG. 2A is a block diagram illustrating a communication sequence for authorizing a session between a client and a network access server;

FIG. 2B is a block diagram illustrating another communication sequence for authorizing a session between a client and a network access server;

DETAILED DESCRIPTION OF THE PREFERRED EMBODIMENT

Figure 1A:
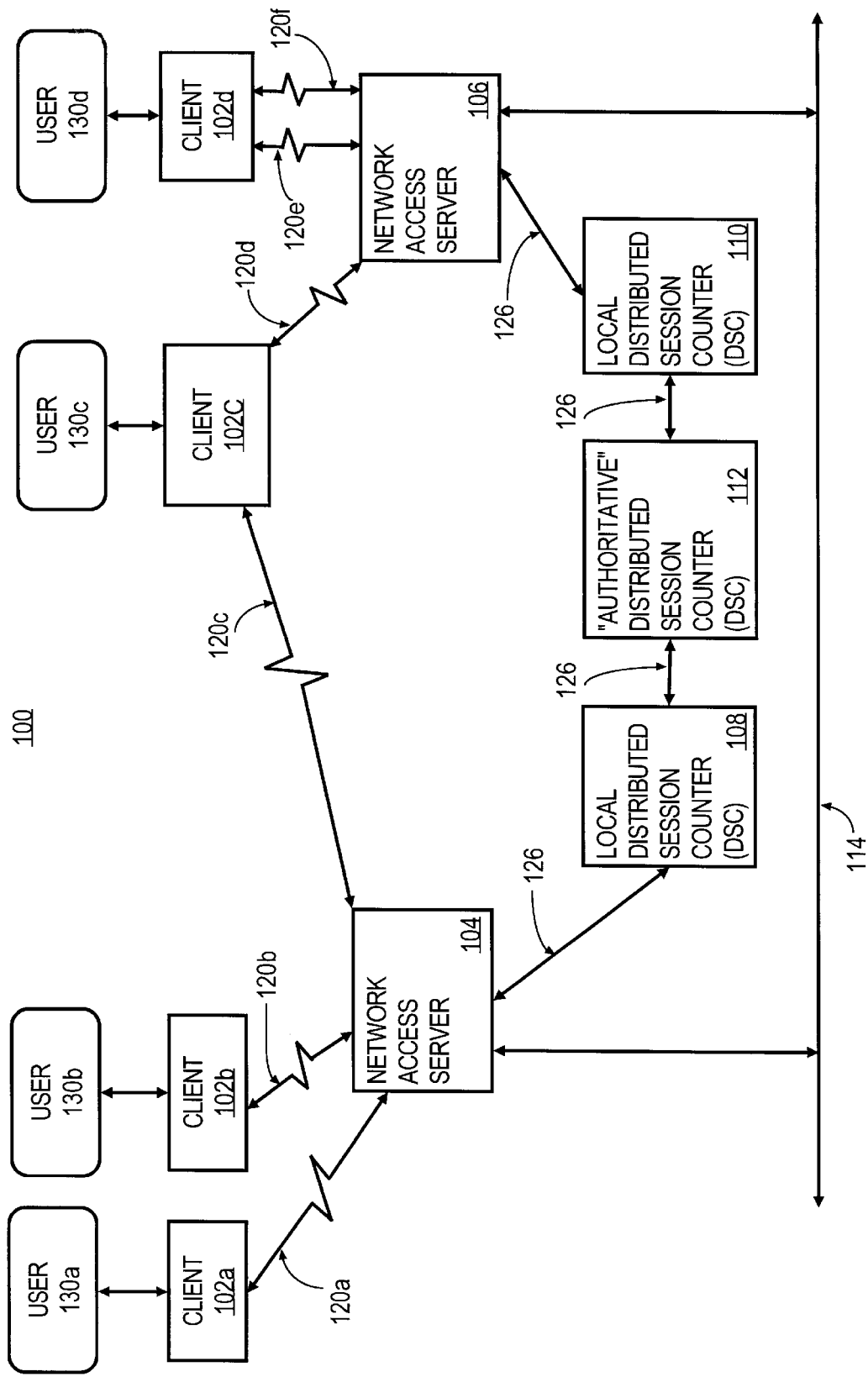
FIG. 1A is a block diagram of a computer system architecture in which the present invention may be utilized.

A method and apparatus for performing a disconnect policy in a distributed computing system is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OPERATIONAL CONTEXT

A disconnect policy for a distributed computing system is provided. In one embodiment, each entity is assigned an authoritative server (authoritative distribution session counter ("DSC")). In this context, a particular entity includes both single users and groups of users. For example, a particular entity may be (1) an individual such as "John"; (2) employees of a particular group of a company, such as the marketing or engineering group; or (3) all employees or groups of individuals that make up a particular company or organization.

The authoritative DSC that is assigned to a particular entity is responsible for maintaining global session information that is used to respond to authorization requests from "local" DSCs. In this context, a local DSC is a server that has received a request to authorize a session for a particular entity but for which the server is not been assigned as the authoritative DSC for the particular entity. However, as will be described in further detail below, in certain embodiments, a particular DSC may function as both a local DSC and an authoritative DSC.

In one embodiment, after determining that it cannot communicate with an authoritative DSC that has been assigned as the authoritative server for a particular entity, the local DSC assumes the authoritative duties of the authoritative DSC for connection requests that are received at the local DSC for the particular entity. In this aspect, when a connection request is received by the local DSC for the particular entity, the local DSC determines whether or not a session should be established by comparing the number of active sessions that have been authorized by the local DSC for the particular entity, with total number of sessions that have been allocated for the particular entity. If the number of active sessions that have been authorized by the local DSC for the particular entity is less than the total number of sessions that have been allocated for the particular entity, then the session is allowed to be established. Thus, the local DSC may itself authorize the total number of sessions that have been allocated for the particular entity as it does not take into account the active sessions that have been authorized by other DSCs.

In a similar manner, when an authoritative DSC determines that it can no longer communicate with a local DSC, the authoritative DSC ignores all sessions that were active for the particular entity at the time of the failure and which were authorized by the local DSC. In this aspect, the authoritative DSC functions as if all sessions that were authorized by the local DSC have terminated and therefore do not count against the total number of sessions that can be currently active for the particular entity. Thus, the authoritative DSC can also authorize the total number of sessions that have been allocated for the particular entity. In this manner under-subscription is prevented as sessions that have terminated are not mistakenly counted in the total number of sessions that are actively established for the particular entity.

A side-effect of allowing the total number of sessions that are allocated for the particular entity to be actively established by both the local DSC and the authoritative DSC is that over-subscription may occur. However, because a local DSC may only oversubscribe alter it determines that it can no longer communicate with an authoritative DSC and that it may only authorize at most the total number of session that have been allocated for a particular entity that is assigned the authoritative DSC, a controlled over-subscription mechanism is provided.

For explanation purposes a distributed authorization mechanism for managing and regulating connections to a distributed computing system is first described to illustrate a context in which the invention can be used. Thereafter, a disconnect policy is described in the context of the distributed computing system which reduces the problem of under-subscription and the need to maintain a hot backup system.

DISTRIBUTED AUTHORIZATION MECHANISM

In the distributed authorization mechanism context, when a network access server receives a message from a client requesting that a connection be established for accessing a network system, the network access server sends an authorization request message to a local DSC requesting authorization to establish a session with the client. Upon receiving the authorization request message, the local DSC determines whether it can authorize the session itself (the "FAST LANE" approach) or whether the local DSC must communicate with an authoritative DSC to determine whether the session should be authorized (the "SLOW LANE" approach).

The terms "local" and "authoritative" are merely convenient labels for the elements that serve as distributed session counters. The term "local" means only that a particular DSC is not authoritative for the particular entity of reference and is not intended to imply a required geographic location.

In one embodiment, to determine whether FAST LANE authorization can be performed, the local DSC retrieves a local session count to determine the number of sessions that are currently established for the particular entity. After determining the number of sessions that are currently established for the particular entity, the local DSC compares the number of sessions that are currently maintained for the particular entity with a "local" session threshold value that is maintained for the particular entity. In this context, a local threshold value identifies a maximum number of sessions that may be currently established for a particular entity before SLOW LANE authorization is required. By adjusting the local threshold values, the performance of the distributed system can be tuned to provide faster connection response time (FAST LANE) or a more accurate control of the number of sessions that are established for each entity.

Thus, based on the comparison, the local DSC determines whether it can authorize the connection itself (FAST LANE) or whether it must communicate with an authoritative DSC to determine whether the session should be allowed (SLOW LANE). If the local DSC determines that it can authorize the session itself, it sends an authorization grant message back to the network access server without requesting authorization from the authoritative DCS. Thereafter, the local DSC sends a message to the authoritative DSC indicating that a session was authorized for the particular entity.

However, if the local DSC determines that it cannot authorize the session itself, the local DSC sends an authorization request message to the authoritative DSC requesting authorization for establishing a session for the particular entity. Upon receiving the authorization request message from the local DCS, the authoritative DSC determines whether a session should be authorized for the particular entity. In one embodiment, upon receiving the authorization request, the authoritative DSC determines the number of connections that are currently established for the particular client. In certain embodiments, the authoritative DSC retrieves a "global" session count to determine the number of sessions that are currently established for the particular entity. The authoritative DSC then compares the global session count with a "total" session threshold value that is associated with the particular entity. In this context, the total session threshold value represents the total number of sessions that are to be allowed for a particular entity at any one point in time.

Based on the comparison, the authoritative DSC determines whether the session should be allowed for the particular entity. If the authoritative DSC determines that the session should not be authorized, the authoritative DSC returns an Authorization Denied message back to the local DCS. The local DSC then sends an Authorization Denied message to the network access server to indicate that the session should not be established with the client for the particular entity.

Alternatively, if the authoritative DSC determines that the session should be authorized, the authoritative DSC returns an Authorization Granted message back to the local DSC. The local DSC then sends an Authorization Granted message to the network access server to indicate that the session can be established with the client for the particular entity.

FIG. 1A is a block diagram of a system 100 in which the invention can be used. Generally, the system 100 includes one or more clients 102a–d, one or more network access servers 104. 106, one or more local distributed session counters (DSCs) 108, 110, an authoritative DSC 112, and a network 114.

Each of the clients 102a–d may be a device such as a personal computer, workstation, router, switch or other network device. The particular form of a client 102a–d is not critical. What is important is that the clients 102a–d are capable of dialing into 15 network access server 104, 106 to establish sessions 120a–f, respectively. The clients 102a–d are respectively used by or associated with users 130a–d. In this example, the users 130a–d represent different entities that interact with clients 102a–d. Although FIG. 1A depicts only a single user (entity) interfacing with each of the clients 102a–d to establish sessions with network access servers 104. 106, in certain embodiments, multiple users (entities) may interface with one client to establish sessions with network access servers 104. 106.

Remote dial-in connections are typically made using one of the Internet's standard dial-in protocols, such as Point-to-Point Protocol (PPP) or the Serial Line Internet Protocol (SLIP). In a preferred embodiment, each connection 120a–d is established as PPP connections. However, PPP is merely an example of a communications protocol that can be used in an embodiment. Other protocols, such as SLIP, which facilitate the exchange of information between a client and server can be used. PPP is described in "Understanding PPP and PPP Authentication," accessible at http://www-fr.cisco.com/warp/public/779/smbiz/service/knowledge/wan/ppp_auth.htm. PPP is defined in W. Simpson, "The Point-to-Point Protocol," RFC 1548, December 1993. The multilink variant of PPP is described in K. Sklower et al., "The PPP Multilink Protocol (MP)," RFC 1990, August 1996.

Network 114 contains resources and information that arc protected by and accessible through network access servers 104, 106. Network 114 may be the global packet-switched network known as the Internet, a private Intranet for a particular company, or any combination thereof. The network 114 may form part of a LAN or WAN and may use a variety of different communication protocols.

The network access servers 104, 106 are computers, or one or more hardware or software components or processes that cooperate or execute in one or more computer systems. The network access servers 104, 106 are coupled to the network 114 and provide remote access to the network 114 for clients 102a–d. Model AS5300, commercially available from Cisco Systems, Inc., can be used as network access servers 104, 106.

In certain embodiments, a firewall (not shown), such as the Cisco PIX Firewall, which is commercially available from Cisco Systems, Inc, may be logically interposed between the network access servers 104, 106, and network 114. The firewall may control access and log-in attempts to network 114 based on identification information that is associated with the outside communication, by intercepting all communications moving to and from the network access servers 104, 106 and determining whether to admit or block the communications. The firewall can be used to prevent unauthorized clients from connecting to network 114 and other devices that are logically behind the firewall.

The network access servers 104, 106 communicate respectively with local DSCs 108, 110 to determine whether a session should be allowed for a particular entity. In this configuration, the local DSCs 108 and 110 function in a manner that is similar to a cache. For example, by "caching" a local threshold value at the local DSCs, a determination can be made as whether a session request can be authorized locally (FAST LANE) or whether communication with an authoritative DSC is required (SLOW LANE).

The network access servers may function as both a client and a server in communicating with the other components. In one embodiment, network access servers 104, 106 are respectively coupled to DSC 108 and DSC 110 over network 126 as shown in FIG. 1A. It should be noted that although FIG. 1A depicts only a single network access server connected to a particular DSC, in certain embodiments, multiple network access servers may connect to a particular DSC.

In this example, for explanation purposes and so as to not obscure certain connections between the components of system 100, authoritative DSC 112 has been illustrated as not being connected to a network access server. However, in a preferred embodiment, one or more network access servers are coupled to authoritative DSC 112. In this context, the authoritative DSC 112 may function as both an authoritative DSC and a local DSC in determining whether a session should be allowed for a particular entity.

The DSCs 108, 110 and 112 may be implemented in one or more servers. Thus, although the term DSC has been used in this context, other terms such as Max Session Server may also be used to describe these components. In certain embodiments, the network access servers and the DSCs may both or separately be configured to execute the Cisco Internetworking Operating System (IOS). In a preferred embodiment, the network 114 includes one or more authorization, authentication, and accounting (AAA) servers (not shown) that execute as part of the network operating system to carry out network authentication and authorization. In a preferred embodiment, the AAA servers reside within the same box or hardware unit as the DSCs. In this context, the DSC functions as a "library" when queried by the AAA server to determine whether a session should be authorized for a particular entity. In addition, in a preferred embodiment, the communication between two DSCs and between a network access server and a DSC is performed by the AAA server that is associated with a DSC.

Appendix A sets forth a preferred communication protocol that may be used, in one embodiment, for communicating between different DSCs and between a DSC and a GUI Administration tool.

FIG. 1B shows an alternative embodiment in which network access servers 104, 106 may be respectively coupled to local DSCs 108, 110 over network 114. For example, local DSCs 108, 110, and authoritative DSC 112 may be coupled to a network system such as the Internet and as such, may communicate with network access servers 104, 106 via the Internet. In certain embodiments, messages that are communicated between network access servers and DSCs are encrypted to maintain a secure communication link over network 114. For example, messages communicated between the network access servers 104 and 106 and the local DSCs 108 and 110 may be encrypted to maintain a secure communication link over network 114. In addition, messages that are communicated between the different DSCs may also be encrypted to provide for a higher level of security.

The local DSCs 108, 110 are computers, or one or more hardware or software components or processes that cooperate or execute in one or more computer systems. In one embodiment, session information is distributed across local DSCs 108, 110 to provide for local authorization of connection requests. For example, local DSCs 108, 110 respectively maintain "distributed session information" for network access servers 104, 106. The distributed session information is used to determine whether local DSCs 108, 110 can themselves authorize connection requests from respective network access servers 104, 106 (FAST LANE), or whether local DSCs 108, 110 need to communicate with the authoritative DSC 112 for authorization (SLOW LANE). The distributed session information that is maintained by the local DSCs 108, 110 is described further below.

The authoritative DSC 112 is also a computer, or one or more hardware or software components or processes that cooperate or execute in one or more computer systems. The authoritative DSC 112 maintains "global session information" that is used, when requested by local DSCs 108, 110, to determine whether a session should be authorize for a particular entity. The authoritative DSC 112 is also responsible for broadcasting global session information to some or all of the one or more local DSCs 108, 110 so that they may maintain up-to-date session information.

"Fast Lane" and "Slow Lane" Communication Sequences

As previously indicated, using the distributed authorization model, the authorization of a connection request for a particular entity can be performed by a FAST LANE or SLOW LANE authorization communication sequence. In the FAST LANE communication sequence, the time that is required to authorize a connection can be significantly reduced, as the authorization of the connection can be performed locally. The terms "FAST LANE" and "SLOW LANE" are merely labels that suggest the differences of the two communication sequences or approaches, and these terms do not imply or require any particular structure or process in and of themselves.

FIG. 2A and FIG. 2B illustrate examples of a SLOW LANE communication sequence 202 and a FAST LANE communication sequence 204 for authorizing a session between a client and a network access server. For purposes of these examples, assume that user 130a interacts with client 102a to establish a session between client 102a and network access server 104.

In the SLOW LANE communication sequence 202, at state 1A, client 102a dials into network access server 104 to request a session for user 130a. At state 2A, the network access server 104 sends a connection request message to local DSC 108, requesting authorization to establish the session. Upon receiving the connection request message, local DSC 108 compares its session threshold value that is associated with user 130a, with a local session count value. The local session count value represents a local count of the number of sessions that are currently established for user 130a. As a result, local DSC 108 determines whether authorization can be performed locally by DSC 108.

In this example, assume that local DSC 108 determines that the local session count for user 130a is currently greater than or equal to the session threshold value associated with user 130a and, therefore, local DSC 108 cannot authorize the session itself, locally. Consequently, at state 3A, local DSC 108 sends an authorization request message to authoritative DSC 112 requesting authorization to establish a session for user 130a. Upon receiving the authorization request message, authoritative DSC 112 determines whether a session should be authorized for user 130a. At state 4A, after determining whether the session should be allowed, authoritative DSC 112 sends a message back to local DSC 108 indicating whether or not the session is authorized. At state 5A, based on the response from authoritative DSC 112, local DSC 108 sends a message to network access server 104 indicating whether or not the session for user 130a should be established. Finally, if the session has been authorized, network access server 104 may then establish a session with client 102a for user 103a.

In the FAST LANE communication sequence 204, at state 1B, client 102a dials into network access server 104 to request that a connection be established for user 130a. At state 2B, network access server 104 sends a connection request message to local DSC 108 requesting authorization to establish a session for user 130a. Upon receiving the request, local DSC 108 compares its session threshold value that is associated with user 130a, with a local session count value. The local session count value represents a local count of the number of sessions that are currently established for user 130a. Accordingly, local DSC 108 determines whether it can perform authorization locally itself.

In this example, assume that local DSC 108 determines that the local session count for user 130a is currently less than the session threshold value associated with user 130a and, therefore, local DSC 108 can authorize the session itself (locally). As a result, at state 3B, local DSC 108 sends a message to the network access server 104 indicating that a session may be established for user 130a. Network access server 104 may then proceed to establish a session with client 102a for user 103a. At state 4B, the local DSC 108 sends a message to the authoritative DSC 112 indicating that a session has been authorized between client 102a and network access server 104 for user 130a. Upon receiving the notification, authoritative DSC 112 updates its global session information to reflect the authorization of the session. At state 5B, authoritative DSC 112 sends a message back to DSC 108 indicating the global session information was updated to reflect the newly established session.

As illustrated, the FAST LANE communication sequence 204 provides a faster authorization response time as authorization can be performed without having to first communicate with the authoritative DSC 112. In certain systems, in which a large number of connection requests may be made concurrently, eliminating the need of having to first communicate with the authoritative DSC 112 for authorization can significant reduce the systems authorization response time.

Distributed Session Counter Configuration

Figure 3:
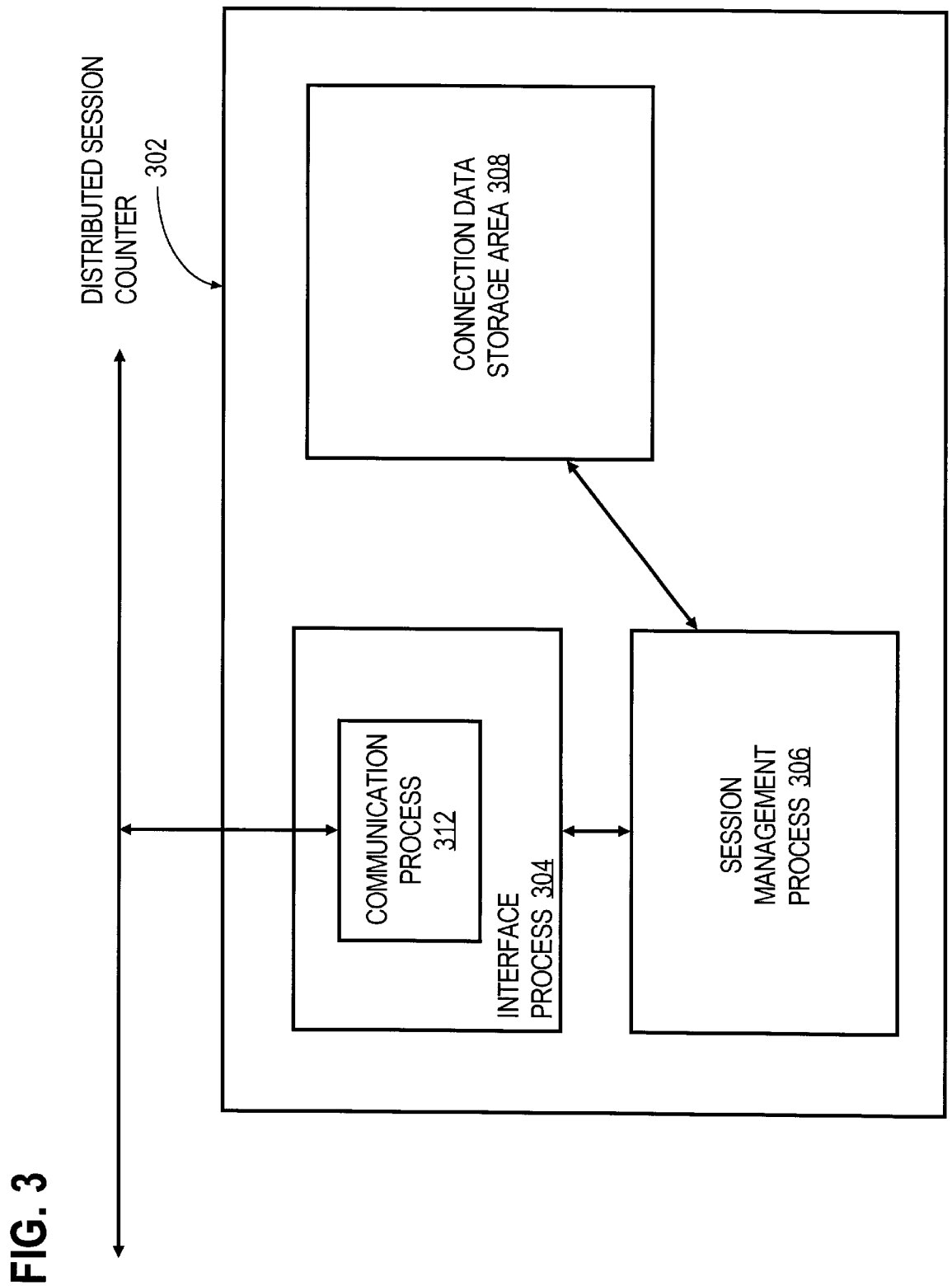
FIG. 3 is a block diagram showing certain internal details of a distributed session counter that is shown in FIG. 1A and FIG. 1B.

FIG. 3 is a block diagram of one embodiment of a distributed session counter 302 showing certain internal details. In certain embodiments, a particular DSC may function as a local DSC, an authoritative DSC or both, as described further below. Each DSC may also function as both a client and a server in communicating with other components of system 100. In one embodiment, the DSCs are configured to execute the Cisco Internetworking Operating System (IOS). In addition, as previously described above, distributed session counter 302 may actually reside within or as part of an AAA server.

In this example, DSC 302 includes an interface process 304, a session management process 306, and a connection data storage area 308. The interface process 304 provides a communication interface that allows DSC 302 to communicate with network access servers and other DSC devices. In certain embodiments, the interface process 304 may have a communication process 312 that can respond to requests from other network access servers and DSC devices. Communication process 312 is a software element, in the preferred embodiment. In one embodiment, communication between the DSC 302 and other network access servers and DSCs may be performed using a client/server relationship. In certain embodiments, the interface process 304 may act as both a client and a server to communicate with other network access servers and DSCs.

Coupled to the interface process 304 is a session management process 306, which is responsible for processing messages received by the interface process 304, and for causing messages to be communicated to the other network access servers and DSCs. In one embodiment, session management process 306 manages, regulates and coordinates the authorizing of sessions for requesting entities. To perform this task, the session management process interfaces with the connection data storage area 308 to store and retrieve connection information.

In one embodiment, when acting as a local DSC, the connection data storage area is used to maintain distributed session information. In certain embodiments, the connection data storage area maintains distributed session information for each entity that has requested a session be established with the particular DSC. The distributed session information for each local DSC may include, but is not limited to, the following information for each entity that has requested a session be established: (1) a local session counter that indicates the total number of sessions that are currently established for the particular entity; (2) a local session threshold that represents a limit as to the number of sessions that can be concurrently established for a particular entity without having to obtain authorization by the authoritative DSC; and (3) an authoritative DSC identifier that indicates a particular DSC that has been assigned as the authoritative DSC for a particular entity.

Table 1 and Table 2 respectively depict examples of the distributed session information that may be maintained in the connection storage area of local DSCs 108. 110 of FIG. 1.

TABLE 1

DISTRIBUTED SESSION INFORMATION

| ENTITY | LOCAL SESSION THRESHOLD | LOCAL SESSION COUNTER | AUTHORITATIVE DSC IDENTIFIER |
|---|---|---|---|
| user 130a | 5 | 1 | DSC 112 |
| user 130b | 10 | 1 | DSC 112 |
| user 130c | 35 | 2 | DSC 112 |

TABLE 2

DISTRIBUTED SESSION INFORMATION

| ENTITY | LOCAL SESSION THRESHOLD | LOCAL SESSION COUNTER | AUTHORITATIVE DSC IDENTIFIER |
|---|---|---|---|
| user 130c | 35 | 2 | DSC 112 |
| user 130d | 10 | 2 | DSC 112 |

Examples of other information that may be contained in the distributed session information include: (1) a DSC session counter for each entity that indicates the number of sessions that have been authorized by the particular DSC (either FAST LANE or SLOW LANE); (2) a DSC session counter for each entity that indicates the number of sessions that have been authorized by the particular DSC (either FAST LANE or SLOW LANE) and which are still currently active; (3) a DSC rejection counter for each entity that indicates the number of connection requests that have been denied by the particular DSC; (4) session termination information that indicates the reason that a session that was authorized by the particular DSC terminated. (5) connection identity information that identifies for each DSC the particular NAS and port that was used to establish a particular session; (6) over-subscription counters that identify for each DSC the number of times over-subscription has occurred for a particular entity: (7) high-water mark indicators that identify for each DSC the extent to which over-subscription has occurred for a particular entity; and (8) various other statistical information that can be used by a local DSC or system administrator to monitor and tune the distributed authorization model.

As previously indicated, a particular DSC may perform the functions of an authoritative DSC instead of, or in addition to acting as a local DSC. In one embodiment, when acting as an authoritative DSC, the connection data storage area is used to maintain global session information. In certain embodiments, the connection data storage area maintains global session information for each entity in which the particular DSC is designated as the authoritative DSC. The global session information for each global DSC may include, but is not limited to the following information: (1) a global session counter variable that indicates the number of sessions that are currently established for a particular entity; (2) a global session threshold variable that represents a limit as to the total number of sessions that can be concurrently established for the particular entity; and (3) a local DSC list that identifies one or more local DSCs through which authorization of a session for the particular entity has previously been requested.

For example, Table 3 illustrates the global distributed session information may be maintained in the connection storage area of authoritative DSC 112 of FIG. 1.

TABLE 3

GLOBAL DISTRIBUTED SESSION INFORMATION

| ENTITY | GLOBAL SESSION THRESHOLD | GLOBAL SESSION COUNTER | LOCAL DSC LIST |
|---|---|---|---|
| user 130a | 10 | 1 | DSC 108 |
| user 130b | 15 | 1 | DSC 108 |
| user 130c | 100 | 2 | DSC 108, DSC 110 |
| user 130d | 25 | 2 | DSC 110 |

Examples of other information that may be contained in the global session information include: (1) a DSC session counter for each entity that indicates the number of sessions that have been authorized for a particular DSC; (2) a DSC active session counter for each entity that indicates the number of sessions that have been authorized for a particular DSC and which are still currently active; (3) a DSC rejection counter that indicates for each DSC the number of authorization requests that have been denied on a per entity basis; (4) a DSC over-subscription counter that indicates for each DSC the number of times over-subscription has occurred for a particular entity; (5) a DSC over-subscription watermark that indicates the extent of over-subscription that has occurred for each entity at each NAS; (6) a DSC reserved session counter for each entity that indicates the current number of sessions that are reserved (allocated) but are not yet active, and (7) various other statistical information that may be used by an authoritative DSC or system administrator to monitor and tune the distributed authorization model.

Using the global session information, authoritative DSC 112 can determine the one or more local DSCs through which a session for a particular entity was established. Using this information, the authoritative DSC can determine to which local DSCs it must broadcast data, so as to inform the local DSCs of the total number of sessions that are currently established for a particular entity. In a preferred embodiment, whenever a global session counter is updated in any manner (incremented, decrement or reset), the authoritative DSC broadcasts the updated value to the local DSCs that are identified in its local DSC list.

Regulating the Number of Sessions Established by an Entity

Figure 4:
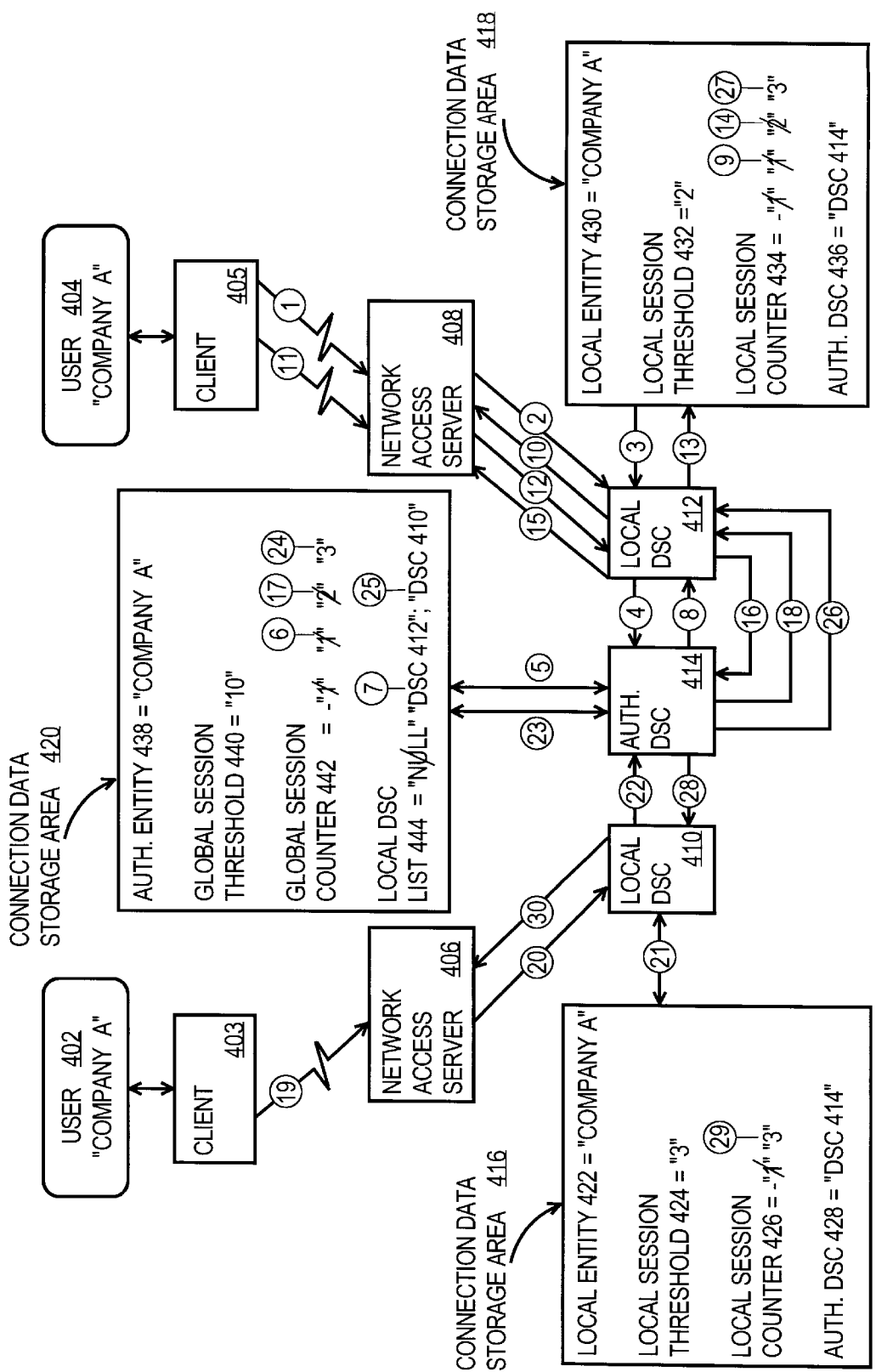
FIG. 4 is a block diagram illustrating a distributed authorization mechanism that may be used to regulate the number of sessions that are established.
Figure 5A:
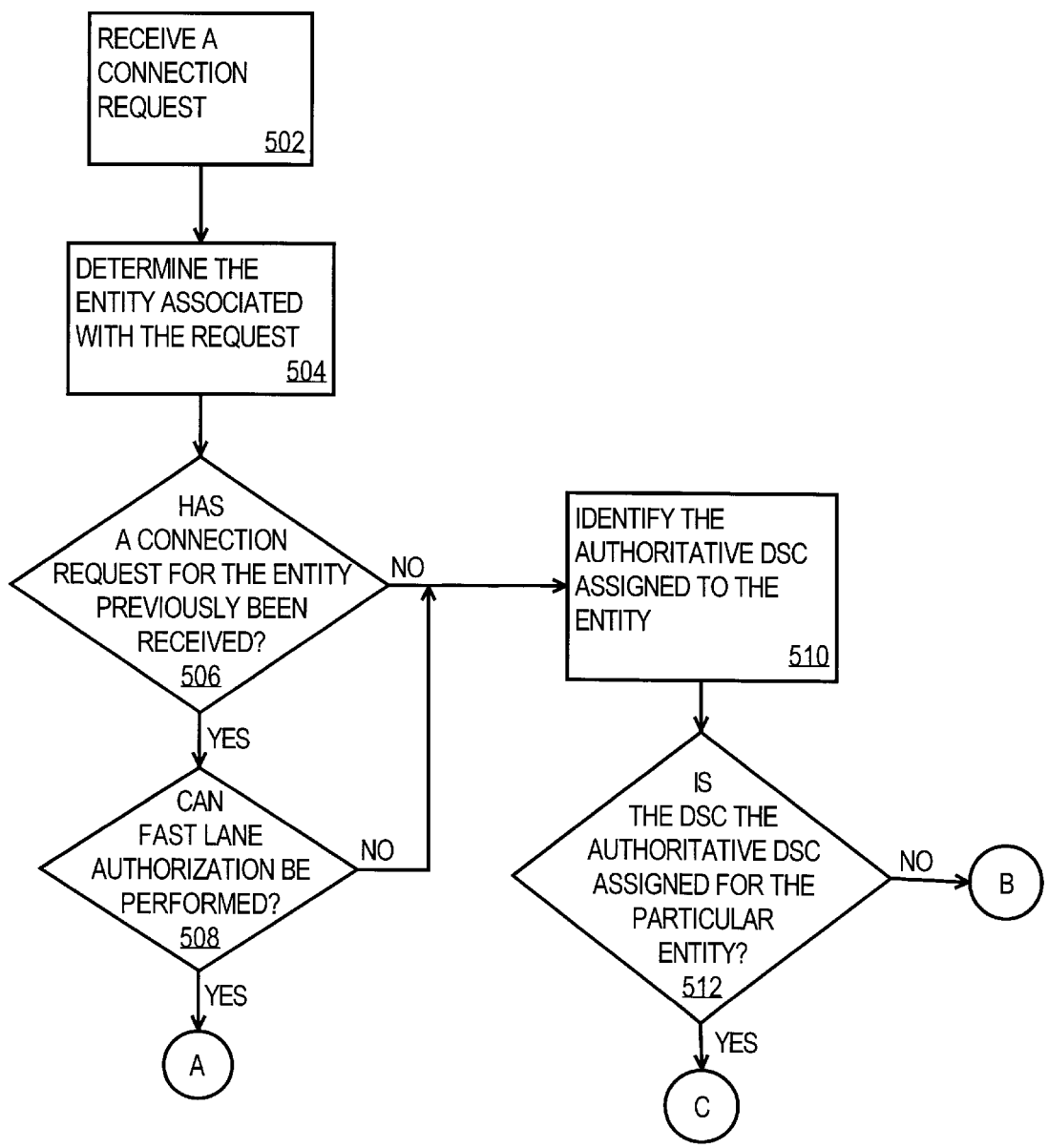
FIG. 5A is a flow diagram that illustrates steps involved in a method for authorizing connection requests.
Figure 5B:
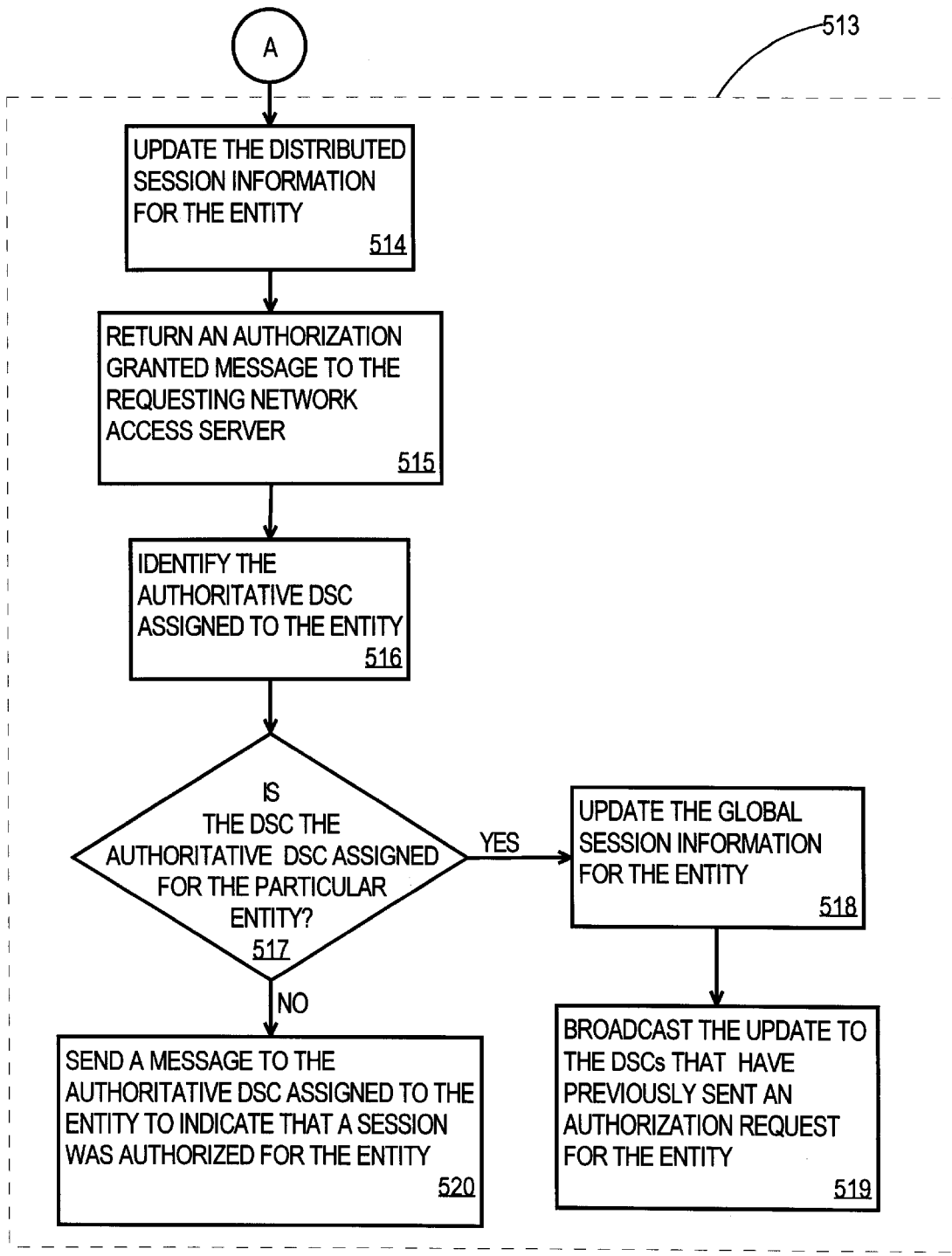
FIG. 5B is a flow diagram that illustrates further steps in the method of FIG. 5A.
Figure 5C:
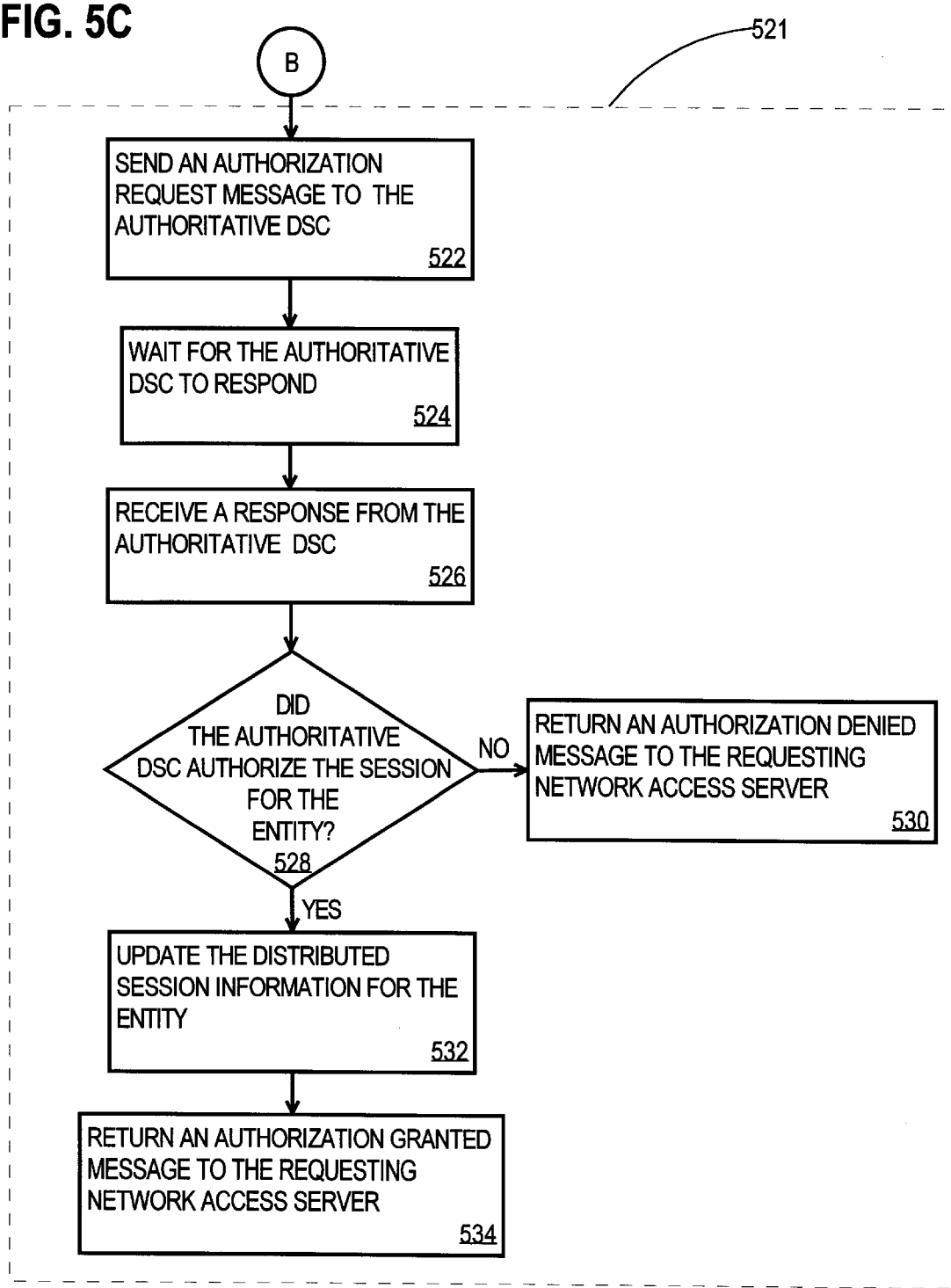
FIG. 5C is a flow diagram that illustrates further steps in the method of FIG. 5A.
Figure 5D:
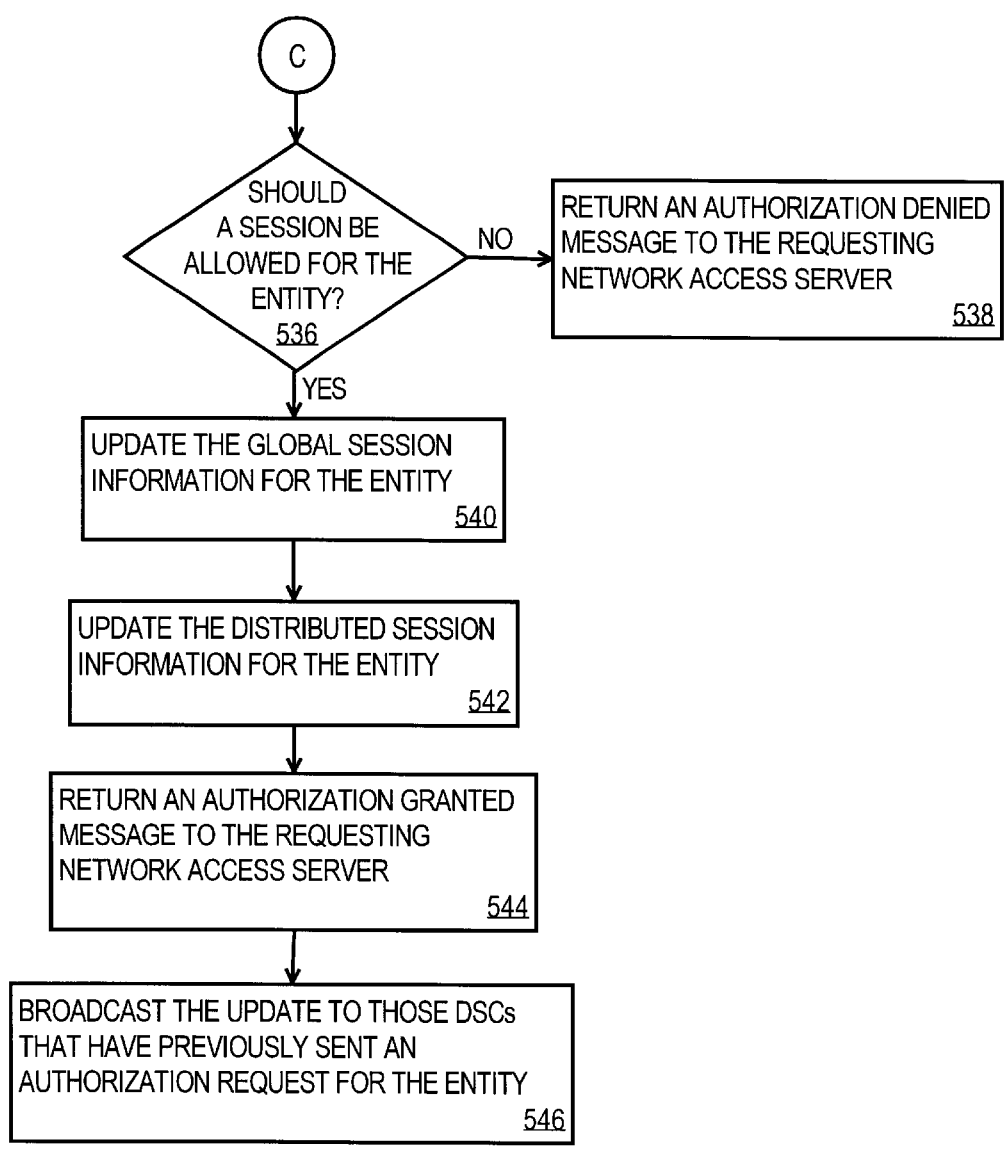
FIG. 5D is a flow diagram that illustrates further steps in the method of FIG. 5A.

FIG. 4 is a block diagram of a system 400 that illustrates a distributed authorization mechanism that may regulate the number of sessions that are established for a particular entity.

System 400 includes users 402 and 404, clients 403 and 405, network access servers 406 and 408, local DSCs 410 and 414 and an authoritative DSC 414. In this example, users 402 and 404 are both employed by an entity known as "COMPANY A". Thus, system 400 has the same general configuration as system 100 of FIG. 1A, FIG. 1B.

Respectively associated with DSCs 410, 412 and 414 are connection data storage areas 416, 418 and 420. In one embodiment, connection data storage areas 416, 418 and 420 are respectively contained in DSCs 410, 412 and 414, as shown in FIG. 3. However, in an alternate embodiment, connection data storage areas 416, 418 and 420 may be maintained separately from one or more of DSCs 410, 412 and 414. In one embodiment, DSCs 410, 412 and 414 may respectively access connection data storage areas 416, 418 and 420 over an internal or external network.

Connection data storage areas 416 and 418 include local distributed session information that is respectively used by local DSCs 410 and 412 to determine if a particular connection request can be authorized locally (FAST LANE) or whether they must request authorization from the authoritative DSC 414 (SLOW LANE). In this example, the local distributed session information in connection data storage area 416 includes a local entity 422 entry for "COMPANY A". For simplicity, this example assumes that a maximum of three (3) local sessions may be established by NAS 406. Therefore, associated with the local entity 422 entry for "COMPANY A" is a local session threshold variable 424 having a value of "3", a local session counter variable 426 that is initially set to "−1" and an authoritative DSC variable 428 that is initially set to "NULL".

Similarly, the local distributed session information in connection data storage area 418 includes a local entity 430 entry for "COMPANY A". Also for simplicity, this example assumes that a maximum of two (2) local sessions may be established by NAS 408. Associated with the local entity 430 entry for "COMPANY A" is a local session threshold variable 432 that equals "2", a local session counter variable 434 that is initially set to "−1" and an authoritative DSC variable 436 that is initially set to "NULL". In certain embodiments, the local session threshold parameters 424 and 432 may be set and adjusted to provide improved system response times while still regulating the number of sessions that are allowed for a particular entity. Although this example illustrates local session threshold variables 424 and 432 having different threshold values, in a preferred embodiment, the local session threshold variables that are associated with a particular entity are all set to the same value within each DSC.

Connection data storage area 420 includes global distributed session information that is used by authoritative DSC 414 to determine whether a particular connection request should be authorized and to distribute global session information to the local DSCs 410 and 412. As depicted connection data storage area 420 includes an authoritative entity 438 entry for the entity "COMPANY A". Assume that a maximum of 10 sessions are authorized for system 400. Associated with the authoritative entity 438 entry for "COMPANY A" is a global session threshold variable 440 that is currently set to "10", a global session counter variable 442 that is initially set to "−1" and a local DSC list 444 that is initially set to "NULL".

In one embodiment, a global storage area (not shown), that is accessible by the DSCs 410, 412 and 414, contains data that maps a particular authoritative DSC to each entity. The global storage area may be used by DSCs to identify an authoritative DSC associated with a particular entity.

In the example of FIG. 4, at state 1, user 404 interacts with client 405 to dial into network access server 408 to request a connection for the entity COMPANY A. At state 2, network access server 408 communicates with local DSC 412 to request authorization to establish a session for COMPANY A. Upon receiving the authorization request, at state 3, local DSC 412 interfaces with connection data storage area 418 to determine the values of local session threshold variable 432, local session counter variable 434, and authoritative DSC parameter 436.

In this example, local DSC 412 determines that, for COMPANY A, local session threshold variable 432 is currently set to "2", authoritative DSC variable 436 is set to "NULL", and local session counter is currently set to "−1." Accordingly, local DSC 412 determines that a counter has not yet been established for COMPANY A in connection with data storage area 418. Therefore, a SLOW LANE authorization communication sequence is required. At state 4, local DSC 412 identifies DSC 414 as being the authoritative DSC for COMPANY A and then sends an authorization request message to the authoritative DSC 414 requesting authorization for establishing a session for COMPANY A.

In one embodiment, local DSC 412 interfaces with a global storage area (not shown), to determine that DSC 414 is assigned as the authoritative DSC for COMPANY A. Local DSC 412 then stores a value that identifies DSC 414 in authoritative DSC variable 436. To illustrate this, FIG. 4 shows that authoritative DSC variable 436 is set equal to "DSC 414".

At state 5, upon receiving the authorization request message from local DSC 412, authoritative DSC 414 interfaces with connection data storage area 420 to retrieve the values of the global session threshold variable 440 and global session counter variable 442. Using these values, authoritative DSC 414 may respectively determine the total number of sessions that allowed for COMPANY A and the total number of sessions that are currently established for COMPANY A. The authoritative DSC 414 then compares the value of the global session threshold parameter 440 with the value of the global session counter parameter 442 to determine whether a new session should be authorized.

In this example, assume that the global session threshold variable 440 equals "10" and the global session counter parameter 442 is currently equal to "NULL". Thus, at state 6, authoritative DSC 414 determines that the session should be authorized and therefore causes the global session counter parameter 442 to be updated to "1".

The authoritative DSC 414 then determines whether local DSC 412 is included in local DSC list 444 in connection data storage area 420. In this example, because the local DSC 412 has not previously requested authoritative DSC 414 to authorize a session for COMPANY A, the local DSC list 444 does not currently include a reference to local DSC 412. Thus, at state 7, authoritative DSC 414 causes local DSC 412 to be added to the local DSC list 444 within connection data storage area 420.

At state 8 authoritative DSC 414 returns an Authorization Granted message back to the local DSC 412. In addition, authoritative DSC 414 uses local DSC list 444 to determine which, if any, DSCs need to be informed of the new current number of sessions that have been authorized for COMPANY A. In one embodiment, a broadcast message with the new current number of sessions is sent to the local DSC that sent the authorization request message. For example, either before or after sending the authorization granted message back to the local DSC 412, the authoritative DSC 414 may broadcast the new current number of sessions to local DSC 412.

In another embodiment, the DSCs that receive the new current number of sessions do not include the local DSC that sent the authorization request message. Instead, the new current number of sessions is included in the authorization granted message that is returned to the local DSC that sent the authorization request message. For example, the Authorization Granted message returned to local DSC 412 in state 8 may include the new current number of sessions for COMPANY A.

At state 9, local DSC 412 causes local session counter 434 in connection data storage area 418 to be updated from "NULL" to "1" to reflect a new current number of sessions for COMPANY A. At state 10, local DSC 412 sends a message to network access server 408 indicating that the session can be established with COMPANY A. At state 11, user 404 interfaces with client 405 to dial into network access server 408 to request that a second connection be established for the entity COMPANY A.

At state 12, the network access server 408 communicates with local DSC 412 to request authorization to establish another session for COMPANY A. Upon receiving the authorization requests at state 13, local DSC 412 interfaces with connection data storage area 418 to determine the values of local session threshold variable 432, local session counter variable 434, and authoritative DSC variable 436.

In this example, local DSC 412 determines that local session threshold variable 432 is currently set to "2", authoritative DSC variable 436 is set to "DSC 414", and local session counter variable 434 is set to "1". Local DSC 412 then compares the value of local session threshold variable 432 with the value of local session counter variable 434. In this case, because the value of local session counter variable 434 ("1") is less than or equal to the value of the local session threshold variable 432 ("2") a FAST LANE authorization communication sequence can be performed. Therefore, at state 14, local DSC 412 causes local session counter variable 434 to be updated from "1" to "2" to reflect a new current number of sessions for COMPANY A.

At state 15, local DSC 412 sends a message to network access server 408 indicating that the session can be established with COMPANY A. At state 16, local DSC 412 sends an authorization update message to authoritative DSC 414 indicating that a session has been authorized for COMPANY A.

At state 17, upon receiving the authorization update message from local DSC 412, authoritative DSC 414 causes the global session counter variable 442 values in connection data storage area 420 to be updated to reflect the authorization of another session for COMPANY A. In this example, the value of global session counter variable 442 is set to "2". At state 18, authoritative DSC 414 sends a reply message back to local DSC 412 indicating that the authorization update message was received and that the global session counter variable 442 has been updated to "2".

At state 19, user 402 interfaces with client 403 to dial into network access server 406 to request that a connection be established for COMPANY A. At state 20, network access server 406 communicates with local DSC 410 to request authorization to establish a session for COMPANY A. Upon receiving the authorization request, at state 21, local DSC 410 interfaces with connection data storage area 416 to determine the values of local session threshold variable 424, local session counter variable 426, and authoritative DSC variable 428. In one embodiment, local DSC 410 interfaces with a global storage area (not shown), that maps a particular authoritative DSC to each entity. In this example, local DSC 410 determines that COMPANY A is mapped to authoritative DSC 414 and therefore updates authoritative DSC variable 428 in connection data storage area 416 to "DSC 414".

In addition, local DSC 410 determines that for COMPANY A, local session threshold variable 424 is currently set to "3" and that local session counter is currently set to "−1", thus indicating that a counter has not yet been established for COMPANY A in connection data storage area 416. Because a counter has not yet been established for COMPANY A, a SLOW LANE authorization communication sequence is carried out. Therefore, at state 22, local DSC 410 sends an authorization request message to the authoritative DSC 414 requesting authorization for establishing a session for COMPANY A.

At state 23, upon receiving the request from local DSC 410, authoritative DSC 414 retrieves values of global session threshold variable 440 and global session counter variable 442 from connection data storage area 420. These values enable authoritative DSC 414 to respectively determine the total number of sessions that allowed for COMPANY A and the total number of sessions that are currently established for COMPANY A. Authoritative DSC 414 then compares the value of global session threshold variable 440 with the value of global session counter variable 442 to determine whether the session should be authorized. In this example, the global session threshold variable 440 currently equals "10" and the global session counter variable 442 is currently equal to "2". Thus, at state 24, authoritative DSC 414 determines that a new session should be authorized and therefore causes the global session counter variable 442 to be set to a value of "3".

The authoritative DSC 414 then determines whether the local DSC 410 is included in local DSC list 444. In this examples because local DSC 410 has not previously sent a request to authoritative DSC 414 to authorize a session for COMPANY A, local DSC list 444 does not currently include a reference to local DSC 410. Thus, at state 25, authoritative DSC 414 causes a value identifying local DSC 410 to be added to local DSC list 444. At state 26, authoritative DSC 414 broadcasts a message that contains the updated global session counter variable 442 value to the DSCs referenced in DSC list 444. In this example, the DSC 414 broadcasts a message containing a value of "3" to DSC 412 and to DSC 410.

At state 27, upon receiving the broadcast message, local DSC 412 updates local session counter variable 434 to reflect the updated value ("3") of global session counter 442. At state 28, an Authorization Granted message is sent to local DSC 410, with the updated value of global session counter variable 442 value for COMPANY A. At state 29, local DSC 410 causes local session counter variable 426 to be set to "3" to reflect the new current number of sessions for COMPANY A. At state 30, the local DSC 410 sends a message to network access server 406 indicating that the session can be established for COMPANY A.

Responding to a Connection Request

FIG. 5A, FIG. 5B, FIG. 5C and FIG. 5D are flow diagrams that illustrate a method for authorizing connection requests in the foregoing context. The steps of FIG. 5A, FIG. 5B, FIG. 5C and FIG. 5D will be explained with reference to FIG. 4.

At block 502, a connection request is received. For example, a DSC receives a connection request from a network access server, requesting authorization to establish a session for a particular entity. Assume that user 404 interacts with client 405 to dial into network access server 408 to establish a session for the entity "COMPANY_A". Assume further that in response, network access server 408 sends a connection request to local DSC 412 to request authorization to establish a session for COMPANY_A.

At block 504, the entity associated with the connection request is determined. In one embodiment, the received connection request includes information that identifies the particular entity, and the determination is done by the DSC. At block 506, the DSC determines whether a connection request has previously been received for the particular entity. For example, upon receiving the connection request, the local DSC 412 searches the distributed session information in connection data storage area 418 to determine whether an entry for COMPANY_A has previously been entered.

If the DSC determines that a connection request has not previously been received for the particular entity then, control proceeds to block 510. However, if the DSC determines that a connection request has previously been received for the particular entity then, at block 508, the DSC determines whether FAST LANE authorization may be performed to determine whether a session should be authorized. For example, local DSC 412 compares the value of the local session threshold counter 432 with the value of the local session counter 434 to determine whether a FAST LANE authorization can be performed. If at block 508 the DSC determines that a FAST LANE authorization can not be performed then, control proceeds to block 510.

Alternatively, if the DSC determines that a FAST LANE authorization can be performed then, at block 513 a FAST LANE authorization is performed to authorize the session. At block 514, the DSC updates its distributed session information to reflect that an additional session will be established for the particular entity. For example, local DSC 412 increments local session counter 434 in the distributed session information in connection data storage area 418 to indicate an additional session has been authorized for COMPANY_A.

At block 515, the DSC returns an authorization granted message to the requesting network access server to indicate a session may be established with the particular entity. The network access server may then perform the necessary functions to establish the session for the particular entity. For example, local DSC 412 returns an authorization granted message to the network access server 408, to indicate a session could be established with COMPANY_A. The network access server 408 then performs the necessary functions to establish a session with the client 405 for COMPANY_A.

At block 516, the DSC identifies the authoritative DSC that is assigned to the particular entity. In one embodiment, a global database that is accessible by the different DSCs contains a mapping that identifies the authoritative DSC that is assigned to a particular entity. Thus, by communicating with the global database, the DSC can identify the authoritative DSC that is assigned to the particular entity.

At block 517, the DSC determines whether it is the authoritative DSC assigned to the particular entity. If the DSC determines that it is not the assigned authoritative DSC for the particular entity then, at block 520, the DSC sends an update message to the assigned authoritative DSC to indicate that the DSC has authorized a session to be established for the particular entity, for example, if local DSC 412 determines that authoritative DSC 414 is the authoritative DSC assigned to COMPANY_A, local DSC 412 sends an update message to authoritative DSC 414 to indicate that a session has been authorized for COMPANY_A.

The DSC may determine, at block 517, that it is the assigned authoritative DSC for the particular entity. In that case, at block 518, the DSC updates the global session information in its connection data storage area to reflect that an additional session will be established. The DSC functions, in effect, as the assigned authoritative DSC for the entity.

At block 519, the DSC identifies the other DSCs that have previously sent an authorization request for the particular entity and broadcasts the update to the identified DSCs. Upon receiving the update, the identified DSCs update their own distributed session information to reflect the received updates. For example, assuming local DSC 412 is the assigned authoritative DSC for COMPANY_A, local DSC 412 uses the local DSC list in the global session information in its connection data storage area 418 to identify the DSCs for broadcasting. The local DSC 412 then broadcasts an update message that contains the updated information to each of the identified DSCs.

At step 510, the DSC identifies the authoritative DSC that is assigned to the particular entity. In one embodiment, a global database that is accessible by the different DSCs contains a mapping that identifies the authoritative DSC that is assigned to a particular entity. Thus, by communicating with the global database, the DSC can identify the authoritative DSC that is assigned to the particular entity. In addition to identifying the authoritative DSC that is assigned to a particular entity, the global database may also include user profile information. For example, the global database may include user profile information that associates a single entity, such as "John", with a group entity, such as "COMPANY_A". In certain embodiments, each DSC maintains its own local copy of some or all of the information that is maintained in the global database. In this context, known database replication technology is used to replicate the information to each local copy.

At block 512, the DSC determines whether it is the authoritative DSC assigned to the particular entity. If at block 512 the DSC determines that it is the assigned authoritative DSC for the particular entity then, control proceeds to block 536. However, if at block 512 the DSC determines that it is not the assigned authoritative DSC for the particular entity then, at block 521, a SLOW LANE authorization is performed.

At block 522, the DSC sends an authorization request message to the assigned authoritative DSC requesting authorization for establishing a session for the particular entity. For example, local DSC 412 sends an authorization message to authoritative DSC 414 requesting authorization for establishing a session for COMPANY_A. At step 524, the DSC waits for the assigned authoritative DSC to respond to its authorization message. Many factors may effect the amount of time that it takes for a response to be received back from the assigned authoritative DSC. In one embodiment, the DSC uses a timer that signals the DSC after a particular amount of time has elapsed. In certain embodiments, the DSC uses the timer to indicate the message may have been lost and that the authorization request message should be resent to the assigned authoritative DSC.

At block 526, a response from the assigned authoritative DSC is received at the DSC. At block 528, based on the response from the assigned authoritative DSC, the DSC determines whether a session should be established. If at block 528 the DSC determine that a session should not be established at block 530, the DSC returns an Authorization Denied message to the requesting network access server to indicate that a session should not be established for the particular entity. For example, upon receiving a response from authoritative DSC 414 that indicates a session should not be established for the entity COMPANY_A, local DSC 412 returns an Authorization Denied message to network access server 408.

However, if at block 528 the DSC determines that a session should be established, then at block 532, the DSC updates its distributed session information to reflect that an additional session will be established, for example local DSC 412 increments local session counter 434 to indicate an additional session is authorized for COMPANY_A.

At block 534, the DSC returns an Authorization Granted message to the requesting network access server to indicate a session may be established with the particular entity. The network access server may then perform the necessary functions to establish the session for the particular entity. At block 536, the DSC, functioning as the assigned authoritative DSC for the particular entity determines whether a session should be established for the particular entity. In one embodiment, to determine whether a session should be established for the particular entity, the DSC compares the value of the global session threshold with the value of the global session counter, for the particular entity. If the value of the global session threshold is less than or equal to the value of the global session counter, the DSC determines that a session should not be established for the particular entity. However, if the value of the global session threshold is greater than the value of the global session counter, the DSC determines that a session should be established for the particular entity.

If at block 536 the DSC determines that a session should not be established for the particular entity, then at block 538 the DSC returns an Authorization Denied message to the requesting network access server to indicate that a session should not be established for the particular entity. However, at block 536 the DSC may determine that a session should be established. In that case, at block 540, the DSC updates the global session information to reflect that an additional session will be established for the particular entity. In this respect, the DSC functions as the assigned authoritative DSC for the entity.

At block 542, the DSC updates its distributed session information to reflect that an additional session will be established. For example., local DSC 412 increments local session counter 434 in the distributed session information in connection data storage area 418. At block 544, the DSC returns an Authorization Granted message to the requesting network access server, indicating that a session may be established with the entity. The network access server may then perform functions necessary to establish the session. For example, local DSC 412 returns an Authorization Granted message to network access server 408 to indicate a session may be established with COMPANY_A. Network access server 408 then establishes a session with client 405 for COMPANY_A.

At block 546, the DSC identifies the other DSCs that have previously sent an authorization request for the entity, and broadcasts the update to those DSCs. Upon receiving the update, the DSCs update their own distributed session information to reflect the received updates. For example, assuming local DSC 412 is the assigned authoritative DSC for the entity COMPANY A, local DSC 412 uses the local DSC list in the global session information in its connection data storage area 418 to identify the DSCs for broadcasting. Local DSC 412 then broadcasts an update message that contains the updated information to each of the identified DSCs.

Responding to an Authorization Request

Figure 6:
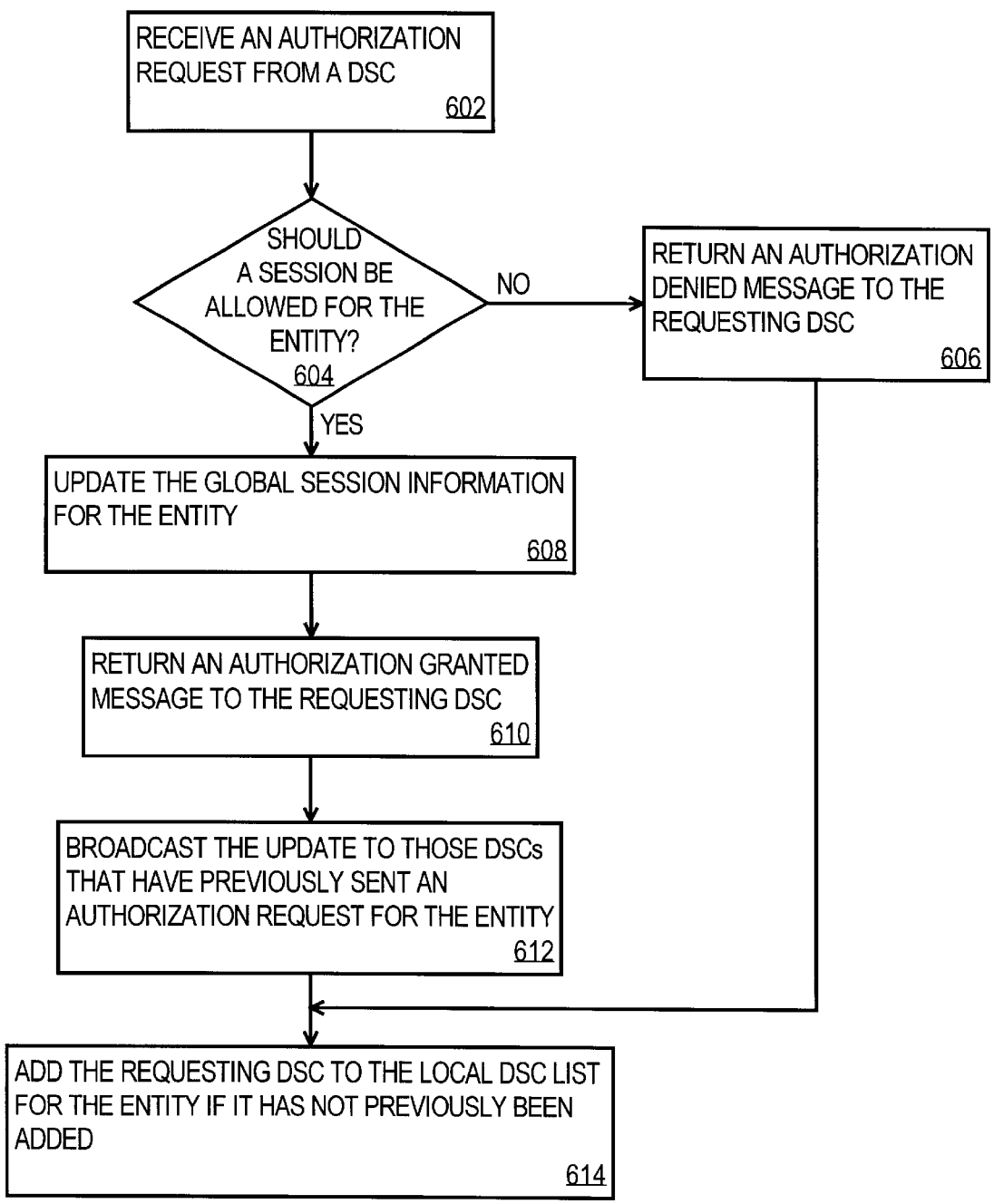
FIG. 6 is flow a diagram that illustrates a method for responding to authorization requests sent by a distributed session counter.

FIG. 6 is flow a diagram that illustrates a method for responding to authorization requests sent by a DSC in the foregoing context. The steps of FIG. 6 are explained with reference to FIG. 4.

At block 602, an authorization request is received from a DSC. For example, an authorization request is received at an authoritative DSC from a local DSC requesting authorization to establish a session for a particular entity. Assume that an authorization request is received at authoritative DSC 414 from local DSC 412 requesting authorization to establish a session for the entity "COMPANY_A". Assume also that authoritative DSC 414 has been assigned as the authoritative DSC for COMPANY_A.

At block 604, the authoritative DSC for the entity determines whether a session should be established. In one embodiment, the authoritative DSC compares the value of the global session threshold with the value of the global session counter, for the particular entity. For example, upon receiving, an authorization request from local DSC 412 for COMPANY_A, authoritative DSC 414 compares the value of global session threshold 440 with global session counter 420, for the entity, maintained in the global session information in connection data storage area 420. If the value of the global session threshold 440 is less than or equal to the value of the global session counter 442, then a session should not be established for COMPANY_A. However, if the authoritative DSC 414 determines that the value of global session threshold 440 is greater than global session counter 442, then a session should be established for COMPANY_A.

If at block 604 the authoritative DSC determines that a session should not be established, then at block 606, the authoritative DSC returns an Authorization Denied message to the requesting local DSC to indicate that a session should not be established. For example, in response to determining that a session should not be established for COMPANY_A, authoritative DSC 414 returns an Authorization Denied message to local DSC 412 indicating that a session should not be established for the entity COMPANY_A. Control then proceeds to block 614.

However, if the authoritative DSC determines that a session should be established for the particular entity, then at block 608 the authoritative DSC updates the global session information in its connection data storage area to show that an additional session will be established for the particular entity. For example, in response to determining that a session may be established for COMPANY_A, authoritative DSC 414 updates global session counter 442 to reflect that a session will be established for COMPANY_A.

At block 610, the authoritative DSC returns an Authorization Granted message to the requesting local DSC to indicate that a session can be established with the particular entity. For example, authoritative DSC 414 returns an Authorization Granted message to local DSC 412 indicating that a session can be established for COMPANY_A.

At block 612, the authoritative DSC identifies the other DSCs that have previously sent an authorization request for COMPANY_A and broadcasts the update to those DSCs. Upon receiving the update, the identified DSCs update their own distributed session information to reflect the received update. In one embodiment, the authoritative DSC uses a local DSC list that is maintained in the global session information in its connection data storage area to identify the DSCs for broadcasting. For example, assuming that local DSC 410 had previously sent an authorization request to authoritative DSC 414 for the entity COMPANY_A, in searching local DSC list 444, authoritative DSC 414 identifies local DSC 410 for broadcasting. The authoritative DSC 414 then broadcasts to local DSC 410 the updates that are maintained in the global session information in connection data storage area 420 for entity COMPANY_A. Upon receiving the update, the local DSC 410 causes its own distributed session information to reflect the received updates At block 614, if the authorization request message represents the first authorization request that was sent by the local DSC for the particular entity, then the authoritative DSC updates the global session information in its connection data storage area. The updates indicate that changes to the global session information for the particular entity should be broadcast to the local DSC. For example, if the authorization request message is the first authorization request sent by local DSC 412 for COMPANY_A, then authoritative DSC 414 updates local DSC list 444 to include an entry for DSC 412.

Terminating Sessions

In one embodiment, when a session terminates, a network access server sends a connection termination message to a DSC to indicate that a session for a particular entity terminated. In one embodiment, the network access server maintains a record that indicates, for each session, the particular DSC that authorized the session for the entity. In certain embodiments, the network access server uses the record to send the connection termination message to the same DSC that authorized the terminated session. In another embodiment, the network access server selects a DSC other than the one that authorized the terminated session for sending the connection termination message.

Upon receiving a connection termination message, the DSC identifies the authoritative DSC assigned to the particular entity. If the DSC determines that itself is the authoritative DSC assigned to the entity, it updates the global session information in its connection data storage area to reflect termination of the session. The DSC then identifies the other DSCs that previously sent an authorization request for the particular entity and broadcasts the update to the identified DSCs. Upon receiving the broadcast update, the identified DSCs update their own distributed session information to reflect that the session terminated.

However, if the DSC determines that it is not the authoritative DSC assigned to the entity, the DSC sends a session termination message to the authoritative DSC that is assigned to the entity. In response the authoritative DSC updates the global session information in its connection data storage area to reflect the termination of the session for the particular entity. The authoritative DSC then identifies the other DSCs that previously sent an authorization request for the particular entity and broadcasts the update to those DSCs. Upon receiving the broadcast update, those DSCs update their own distributed session information.

Multiple User Entities

In certain embodiments, a particular user may be associated with more than one entity. For example, a user by the name of "John" who works in the "Engineering Department" of "COMPANY A" may be associated with three entities (a client computer named John, the Engineering Department, and COMPANY A). Each entity is assigned a separate global session threshold value that defines the maximum number of sessions that may be established for an entity at a time. For example, client computer John may be assigned a global session threshold value of "5"; the Engineering Department may be assigned a global session threshold value of "100": and COMPANY A may be assigned a global session threshold value of "1000".

Figure 7:
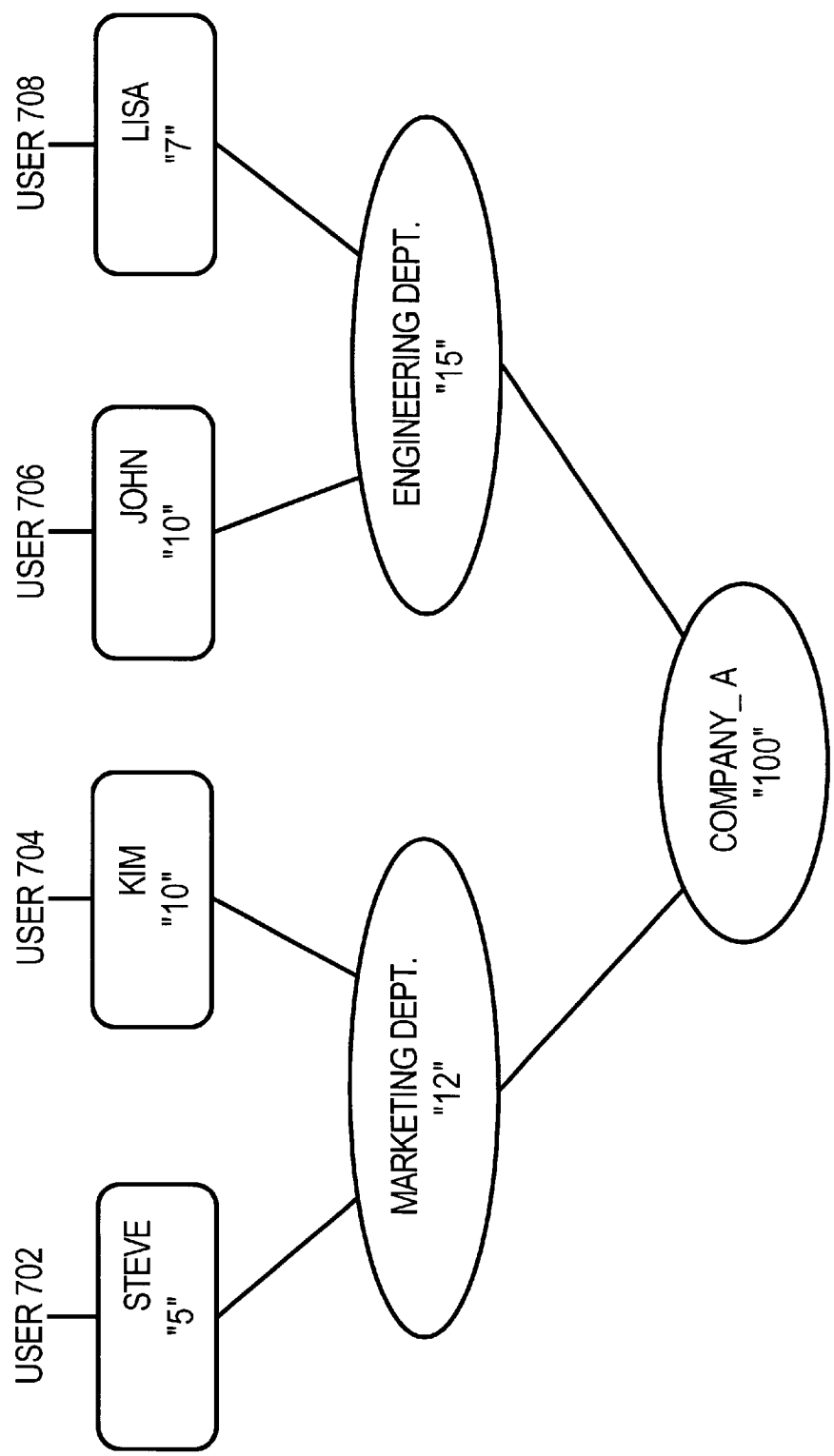
FIG. 7 illustrates a multi-level authorization mechanism that may be used to control the number of sessions that are concurrently active for a particular user.

FIG. 7 illustrates an example of a multi-level authorization mechanism 700 that may be used to control the number of sessions that are concurrently active for a particular user. In this example. COMPANY_A is assigned a global session threshold value of "100". Marketing Department and Engineering Department of COMPANY_A are respectively assigned global session threshold values of "12" and "15". Steve and the Kim, which are client computers associated with employees in the Marketing Department of COMPANY_A, are respectively assigned global session threshold values of "5" and "10". John and Lisa, which represent client computers associated with employees in the Engineering Department, have global session threshold values of "10" and "7".

In one embodiment, the global session threshold values that are assigned to entities, and that are associated with a particular user, are used as a multi-level authorization mechanism to determine whether a session should authorized for the particular user. For example, the user 706 is associated with the entities John, Engineering Department and COMPANY_A. Therefore, to determine whether a session should be authorized for user 706, the number of sessions that are currently active for the entities John, Marketing Department and COMPANY_A must be determined and compared against their respective global session threshold values. If the number of currently active sessions for any of the entities John, Marketing Department or COMPANY_A is greater than or equal to their respective global session threshold values, then authorization is denied.

For example, if COMPANY_A currently has 50 active sessions, the entity Engineering Department currently has 10 sessions and the entity John has 5 sessions, then a request to establish a session for user 706 will be authorized. Authorization will be granted because the number of sessions that are currently active for each entity is less than each respective global session threshold value. However, if COMPANY_A currently has 50 active sessions, Engineering Department has 15 active sessions and John has 0 sessions, then a request to establish a session for user 706 will not be authorized. Authorization is denied because at least one entity, the Engineering Department, currently has its maximum number of sessions.

Distributing Multiple User Entities

In one embodiment, multiple entities that are associated with a particular user are each assigned an authoritative DSC. In certain embodiments, the entities associated with a particular user may be assigned the same authoritative DSC or assigned to different authoritative DSCs. For each entity the authoritative DSC that is assigned maintains global session information for the particular entity.

Figure 8:
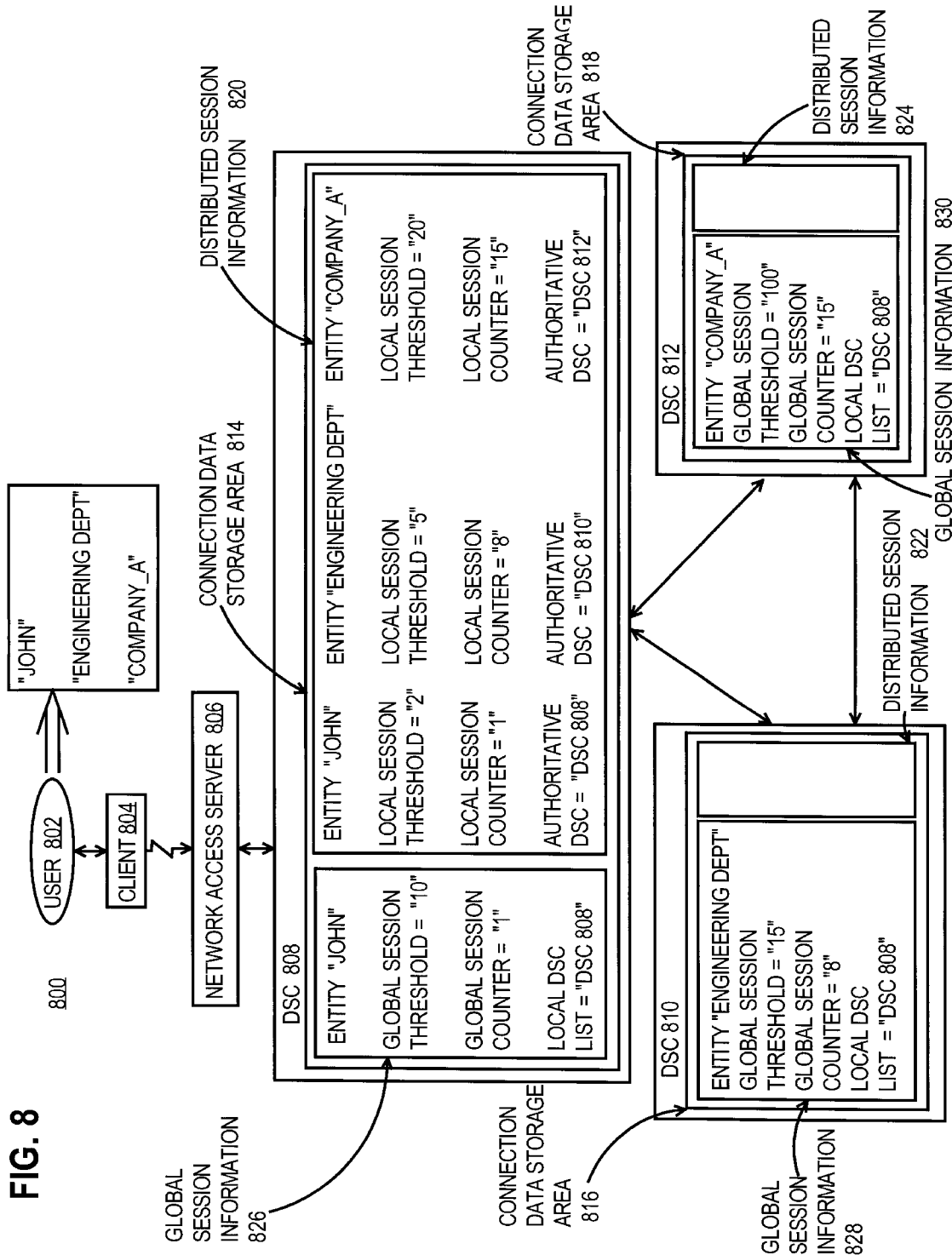
FIG. 8 illustrates a distributed authorization system in which a user is associated with multiple entities.

FIG. 8 illustrates a distributed authorization system 800 in which a user 802 is associated with three entities (John, Engineering Department, and COMPANY_A). In this example, DSC 808 is assigned as the authoritative DSC for John; DSC 810 is assigned as the authoritative DSC for Engineering Department; and DSC 812 is assigned as the authoritative DSC for COMPANY_A. DSC 808 maintains global session information 826 in connection data storage area 814 for John; DSC 810 maintains global session information 828 in connection data storage area 816 for Engineering Department; and DSC 812 maintains global session information 830 in connection data storage area 818 for COMPANY_A.

For purposes of this example, assume:
1. Global session information 826 stores the values: Global session threshold="10"; global session counter="1"; local DSC list="DSC 808".
2. Distributed session information 820 stores the values shown in Table 4:

TABLE 4

DISTRIBUTED SESSION INFORMATION 820 VALUES

| ENTITY | LOCAL SESSION THRESHOLD | LOCAL SESSION COUNTER | AUTHORITATIVE DSC |
|---|---|---|---|
| JOHN | 2 | 1 | DSC 808 |
| ENGINEERING DEPT | 5 | 1 | DSC 810 |
| COMPANY_A | 20 | 15 | DSC 812 |

3. Global session information 828 stores the values: Entity="Engineering Department"; global session threshold=15; global session counter=8; local DSC list="DSC 808".
4. Global session information 830 stores the values: Entity="COMPANY_A"; global session threshold="100"; global session country=15; local DSC list="DSC 808".

User 802 interacts with client 804 to dial into network access server 806 to request the NAS to establish a session. In response, NAS 806 sends a connection request to DSC 808 requesting authorization to establish a session. In a preferred embodiment, a local database, as previously described, is associated with the DSC 808 and contains information that identifies the request as being associated with John, Engineering Department and COMPANY_A. In certain embodiments, the network access server 806 may include information that identifies the request as associated with John, Engineering Department and COMPANY_A. Upon receiving the request, the DSC 808 determines whether a FAST LANE authorization may be performed on a per entity basis.

For example, in receiving the request, the DSC 808 determines whether a FAST LANE authorization may be performed for John. As described in connection with FIG. 4, DSC 808 stores distributed session information 820 for determining whether a FAST LANE authorization sequence can be performed. In this example, for John, the local session counter value is "1" and the local session threshold value is "2", so that DSC 808 determines that a FAST LANE authorization sequence can be performed. In addition, because DSC 808 is assigned as the authoritative DSC for John, DSC 808 may itself determine whether a session should be authorized for John even if a FAST LANE authorization sequence could not be performed.

Alternatively, for Engineering Department, because the local session counter value equals "5" and the local session threshold value equals "8", the DSC 808 determines that a SLOW LANE authorization sequence must be performed. In this case, the DSC 808 identifies DSC 810 as the authoritative DSC for Engineering Department and initiates a SLOW LANE authorization sequence by sending a connection request for Engineering Department to DSC 810.

However, for COMPANY_A, the local session counter value is "15" and the local session threshold value equals "20". Therefore, DSC 808 determines that a FAST LANE authorization sequence can be performed. DSC 808 identifies DSC 810 as the authoritative DSC for Engineering Department and initiates a SLOW LANE authorization sequence by sending a connection request for Engineering Department to DSC 810.

Based on whether a session can be authorized for each of the entities, DSC 808 determines whether an Authorization Granted or an Authorization Denied message should be sent to network access server 806. In one embodiment, if DSC 808 determines that a session can be authorized for each entity, DSC 808 returns an Authorization Granted message to network access server 806 to indicate that a session for user 802 may be established. Alternatively, if DSC 808 determines that a session cannot be authorized for one or more of the entities, the DSC 808 returns an Authorization Denied message to network access server 806 to indicate that a session should not be established. In one embodiment, DSC 808 returns an Authorization Denied message to network access server 806 immediately after determining that a session cannot be authorized for one of the entities. Thus, DSC 808 is not required to wait for every authoritative DSC to respond to before returning an authorization denied message to network access server 806 once it is determined that a session cannot be authorized for an entity.

In certain embodiments, if a DSC determines that a session cannot be granted, the DSC must inform any authoritative DSC that authorized the session for a particular entity that was associated with the request. Once notified, the authoritative DSCs may then update the global session counter that is associated with the entity to reflect that a session could not be established. For example, In a preferred embodiment, a local database, as previously described, is associated with the DSC 808 and contains information that identifies the request as being associated with John, Engineering Department and COMPANY_A. In certain embodiments, the network access server 806 may include information that identifies the request as associated with John, Engineering Department and COMPANY A. Upon receiving the request, the DSC 808 determines whether a FAST LANE authorization may be performed on a per entity basis.

For example, assume that DSC 808 receives a request from network access server 806 to authorize a session for John. Also assume that "15" sessions are currently active for the Engineering Department, thus another session should not be authorized for the Engineering Department. Because John is in the Engineering Department of COMPANY_A, DSC 808 must send an authorization request to both DSC 810 and DSC 812 to respectively request authorization to establish a session for the Engineering Department and the COMPANY_A. In receiving the authorization request from DSC 808, DSC 812 determines that a session can be established for COMPANY_A. DSC then updates its global session counter to indicate that another session has been authorized for COMPANY_A and returns an Authorization Granted message to DSC 808. Alternatively, in receiving the authorization request from DSC 808, DSC 810 determines that a session cannot be established for the Engineering Department and therefore returns an Authorization Denied message to DSC 808. Thus, because the session cannot be established, DSC 808 must notify DSC 812 that the session was not established for COMPANY_A and that global session counter for COMPANY_A should be updated to reflect that the session was not established.

It should be noted that for explanation purposes FIG. 8 depicts connection storage area 814 having connection information for John in both distributed session information 820 and global session information 826. However, because DSC is assigned as the authoritative server for John, connection information for John need only be maintained in global session information 826. Thus, in a preferred embodiment, the connection information that is stored in the DSC that is assigned as the authoritative server for a particular entity is maintained in only the global session information of the DSC.

Distributed Authorization System Prior to Failure

Figure 9A:
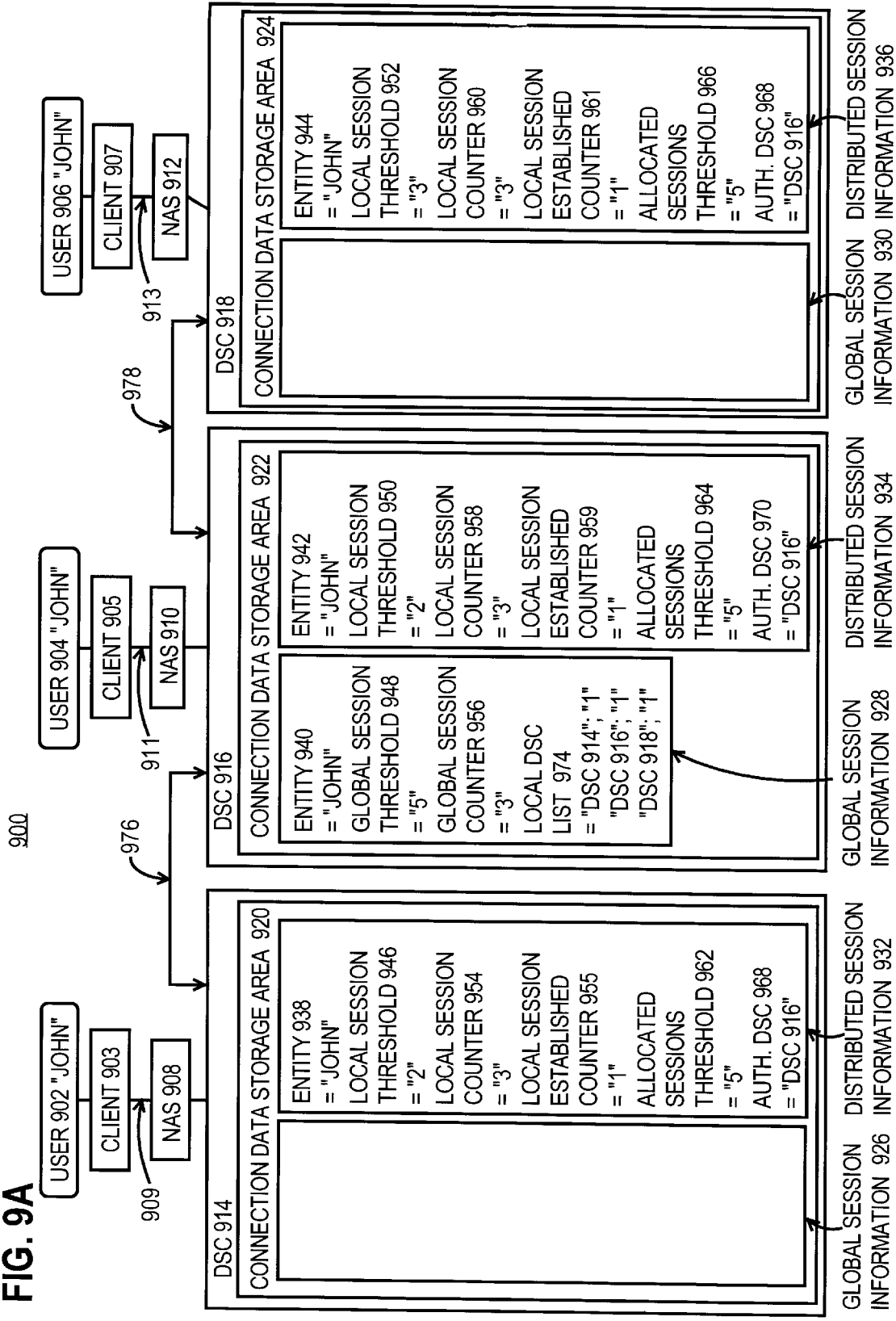
FIG. 9A illustrates a distributed authorization system prior to a communication failure.

FIG. 9A illustrates a distributed authorization system 900 in a normal mode of operation, prior to a failure. In this example, users 902, 904, 906 that are associated with "John" have respectively interacted with clients 903, 905, 907 to establish sessions 909, 911, 913 with network access servers 908, 910, 912. Connection data storage areas 920, 922, 924 each respectively contain connection information that illustrates the state of distributed authorization system 900 after sessions 909, 911, 913 have been established.

For example, distributed session information 932 includes an entity identifier 938, a local session threshold 946, a local session counter 954, a local session established counter 955, an allocated session threshold 962 and an authoritative DSC identifier 968.

The entity identifier 938 indicates that the data in distributed session information 932 is associated with John. The value of local session threshold 946 indicates that a local threshold of "2" will determine whether a FAST LANE or a SLOW LANE authorization is to be performed for John. The value of local session counter 954 indicates that a total of three sessions are currently active for John in system 900. The local session established counter 955 maintains a count of the sessions that are currently active and that have been authorized using DSC 914. In this example, local session established counter 955 has a value of "1" as session 909 is the only session that is both currently active and authorized using DSC 914.

The allocated sessions threshold 962 indicates the number of sessions that have been allocated for John, that is, the number of sessions that may be currently active for John. In one embodiment, the number of sessions allocated for each entity is maintained in the global storage area that maps an authoritative DSC to each entity. In this case, DSC 914 may retrieve the number of sessions allocated for a particular entity when it determines the authoritative DSC that is associated with the particular entity.

In certain embodiments, an authoritative DSC will communicate the number of sessions that are allocated for a particular entity when communicating with the local DSCs. For example, when a local DSC receives a connection request for a particular entity for the first time, while communicating with the authoritative DSC to obtain authorization (SLOW LANE), the authoritative DSC may include the number of sessions allocated for the entity in its response to the authorization request from the local DSC. Alternatively, or in addition, the authoritative DSC may include the number of sessions that have been allocated when broadcasting update messages to local DSCs.

The authoritative DSC value 968 indicates the DSC that has been designated as the authoritative DSC for the particular entity. In this example, the authoritative DSC value 968 indicates that DSC 916 has been designated as the authoritative DSC for John. As such, the global session information 928 of DSC 916 includes the global session information for John. For example, global session information 928 includes an entity identifier 940, a global session threshold 948, a global session counter 956, and a local DSC list 974.

The entity identifier 940 indicates that the data in global session information 928 is associated with John. The value of global session threshold 948 indicates that a total of five active sessions have been allocated for John. The value of the global session counter 956 indicates that a total of three sessions are currently active for John in system 900. The local DSC list 974 indicates the DSCs that have requested authorization to establish a session for John. In addition local DSC list 974 also includes an active session count that indicates the number of sessions that are currently active for each DSC included in the local DSC list 974. In this example the local DSC list 974 indicates that DSCs 914. 916 and 918 have all requested authorization to establish a session for John and that each of DSCs 914, 916 and 918 is associated with one session that is currently active for John. In certain embodiments the local DSC list 974 also keeps track of which NAS and which port is used for each connection request.

Distributed Session counters 914, 916, 918 are shown by way of example in the embodiment of FIG. 9A, however, any server or similar computer process or system may be substituted for these elements. The particular counters, lists, and threshold values illustrated in FIG. 9A are also exemplary. Other data structures, files, variables, processes, or hardware may be used to store equivalent information. Thus, the particular structure shown in FIG. 9A is intended as exemplary and not as limiting or as required structure. In addition, for explanation purposes FIG. 9A depicts connection storage area 922 having connection information for John in both distributed session information 934 and global session information 928. However, because DSC 916 is assigned as the authoritative server for John, connection information for John need only be maintained in global session information 928. Thus, in a preferred embodiment, the connection information that is stored in the DSC that is assigned as the authoritative server for a particular entity is maintained in only the global session information of the DSC.

Recovering from a Communication Failure

Figure 9B:
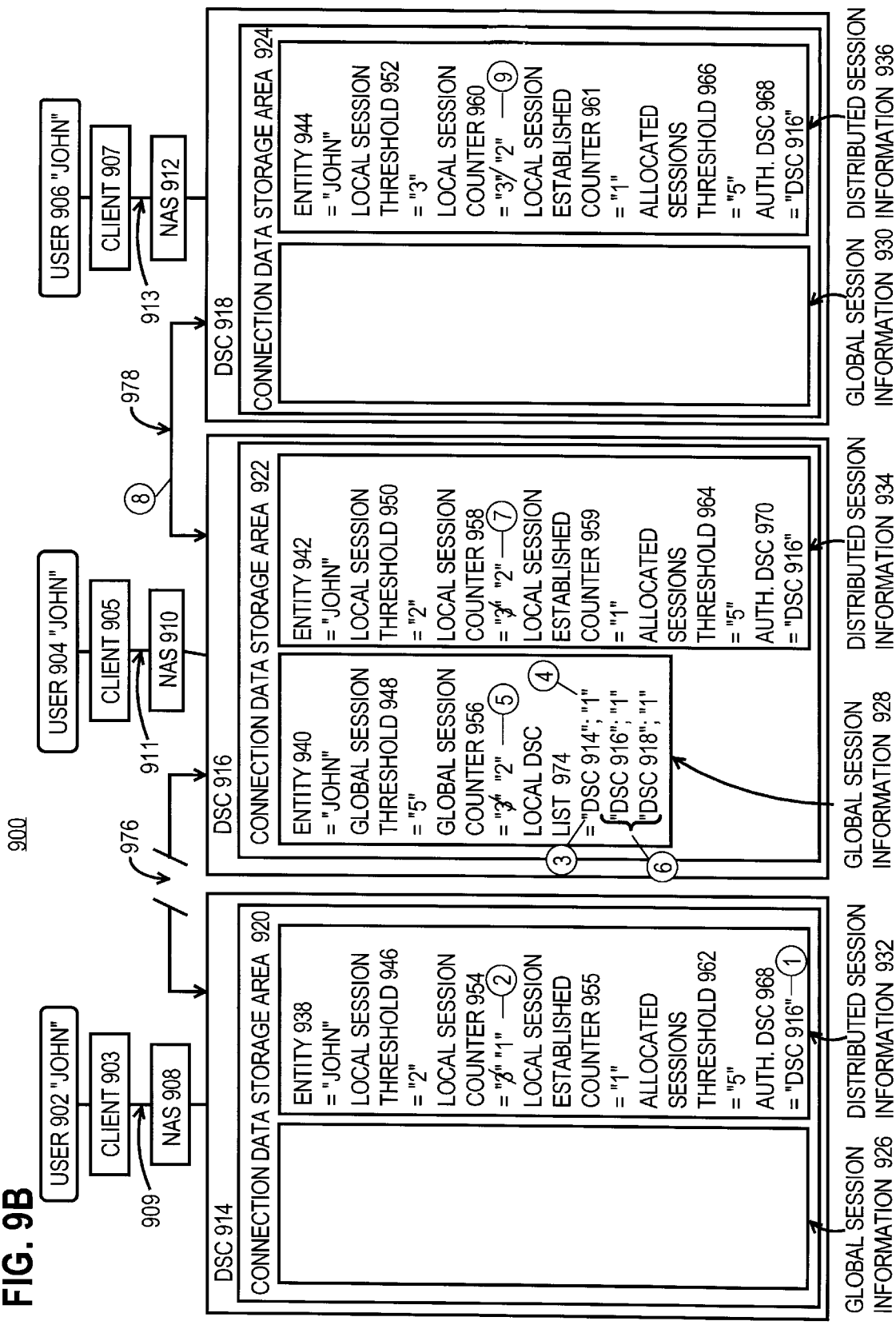
FIG. 9B illustrates a distributed authorization system after a communication failure.

FIG. 9B illustrates the distributed authorization system 900 of FIG. 9A after a communication link has failed ("disconnect state"). In this example, communication link 976, between DSC 914 and DSC 916, has failed. Thus, DSC 914 is no longer able to communicate with DSC 916 to obtain authorization for establishing a session for John, nor is DSC 914 able to communicate authorization update messages to DSC 916 to indicate that a session has been either locally authorized or terminated for John. In addition, DSC 914 is no longer able to receive any updates to global session counter 956 that are broadcast by DSC 916.

In one embodiment, upon detecting that a communication link with an authoritative DSC has failed, the local DSC identifies each entity that was assigned to the authoritative DSC ("assigned entities"). Thereafter, the local session threshold that is associated with each of the assigned entities are no longer used to determine whether a FAST LANE or SLOW LANE authorization is to be performed as all authorization for the assigned entities is performed locally at the local DSC. To perform the authorizations locally, the local DSC uses an allocated sessions threshold variable, that indicates the number of sessions that have allocated for the particular entity, to locally determine whether a session can be authorized. Thus, the local DSC functions as if it is the only DSC within the distributed authorization system that may authorize a session to be established for each of the assigned entities.

Additionally, when the authoritative DSC determines that the Communication link with the local DSC has failed, the authoritative DSC identifies the entities for which it has been assigned as authoritative DSC and for which it has received an authorization request message from the local DSC. The authoritative DSC then ignores any session information that is associated with the local DSC in determining whether to authorize a particular authorization request message or in broadcasting update messages to local DSC.

For example, as shown in state 1, upon detecting that communication link 976 between DSC 914 and DSC 916 has failed. DSC 914 determines that DSC 916 is assigned as the authoritative DSC for John. Because DSC 916 is assigned as the authoritative DSC for John, at state 2, the DSC 914 causes the value of the local session counter 954 to be set equal to the value of the local sessions established counter 955. By setting the local session counter 954 value equal to the value of the local sessions established counter 955, only the sessions that are authorized through DSC 914 will be used in determining whether a session may be authorized.

Thus, upon receiving a connection request message from a network access server that requests authorization to establish a session for John, DSC 914 compares the value of the local session counter 954 with the value of the allocated session threshold 962. If the value of the local session counter 954 is less than the value of the allocated session threshold 962, the DSC 914 increments the local session counter value and returns an authorization granted message to the requesting network access server. However, if the value of the local session counter 954 is not less than the value of the allocated session threshold 962. DSC 914 returns an authorization denied message to the requesting network access server. Thus, DSC 914 may itself authorize the total number of sessions that have been allocated to John. This significantly reduces the chance of an under-subscription problem, because sessions that were previously authorized by the other DSCs (DSC 916 and 918) and which may have terminated unknowingly to DSC 914, are not used to determine whether a session can be authorized for John.

In an alternative embodiment, the DSCs do not maintain a local session established counter for each entity. Instead, whenever a connection fails between a local DSC and an authoritative server, the local DSC resets to zero all local session counters that are associated with entities for which the authoritative DSC is authoritative. For example, assume that DSC 914 does not maintain a local session established counter 955 for John. Upon detecting that communication link 976 between DSC 914 and DSC 916 has failed, DSC 914 causes the value of the local session counter 954 to be set equal to "0". By setting the local session counter 954 value equal to "0", DSC 916 guarantees that under-subscription will not occur, because the DSC will allow at least the number of sessions that have been allocated for John (allocated sessions threshold 962) to be established.

When the DSC 916 determines that the communication link 976 between DSC 914 and DSC 916 has failed, at state 3, the DSC 916 determines that DSC 914 previously sent an authorization request message to DSC 916 for John. In one embodiment, the DSC 916 uses local DSC list 974 to identify DSC 914 as previously sending an authorization request message for John.

At state 4, the DSC 916 determines the number of sessions that were authorized through DSC 914 for "John" and which are currently active. In this example, local DSC list 974 indicates that one currently active session was authorized through DSC 914.

At state 5, the DSC 916 decrements the value of global session counter 956 by the number of sessions that are currently active for John and which were authorized through DSC 914. In this example, the value of global session counter 956 is decreased by one causing its value to be set equal to "2".

At state 6, using local DSC list 974, the DSC 916 identifies the DSCs to which it will broadcast the updated value of global session counter 956. In this example. DSC 916 determines that it will broadcast the updated value of global session counter 956 to DSCs 916 and 918. In one embodiment, as shown in state 7, upon determining that a message is to be broadcast to itself, DSC 916 causes the value of local session counter 958 to be updated without the use of a broadcast message.

At state 8, the DSC 916 broadcasts an update message to DSC 918.

At state 9, upon receiving the broadcast message, the DSC 918 decreases the value of local session counter 960 from "3" to "2".

By ignoring the sessions that were authorized for John through DSC 914, DSC 916 and DSC 918 together may authorize the total number of sessions that have been allocated to John. Likewise, by ignoring the sessions authorized for John through DSC 916 and DSC 918, DSC 914 itself authorizes the total number of sessions that have been allocated to John. Thus, although over-subscription is allowed for John, under-subscription is prevented, because sessions authorized through DSC 914 are not included in the total count of active sessions for John by DSC 916 and DSC 918. Further, sessions authorized through DSC 916 and 918 are not included in the total count of active sessions for John by DSC 914.

Distributed session counters 914, 916. 918 are shown by way of example in the embodiment of FIG. 9B, however, any server or similar computer process or system may be substituted for these elements. The particular counters, lists, and threshold values illustrated in FIG. 9B are also exemplary. Other data structures, files, variables, processes, or hardware may be used to store equivalent information. Thus, the particular structure shown in FIG. 9B is intended as exemplary and not as limiting or as required structure.

Local DSC Failover Sequence

Figure 10:
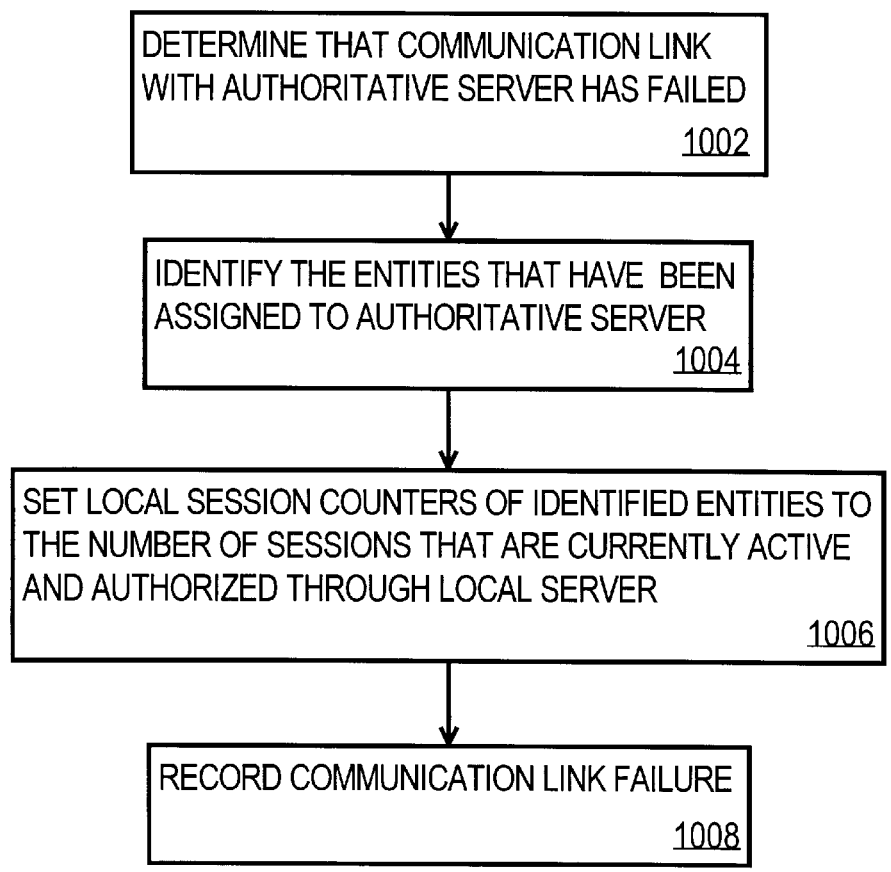
FIG. 10 illustrates a multi-level authorization mechanism that may be used after a communication failure.

FIG. 10 is flow a diagram that illustrates a method for performing a failover sequence among a plurality of servers. For example, failover sequence is carried out at a local DSC upon determining that a communication link with an authoritative DSC has failed. The steps of FIG. 10 are explained with reference to the system 900 of FIG. 9A, by way of example, however, the process of FIG. 10 may be carried out in any computer system, network or arrangement that involves multiple servers that communicate with one another, or clients and servers that communicate.

At block 1002, a first server determines that its communication link with a second server has failed or is unavailable. For example, a local DSC determines that a communication link with an authoritative DSC has failed. Several methods may be used to determine when a communication link has failed. For example, in one embodiment, a "heart beat" message is periodically sent between the two servers or between the local DSC and the authoritative DSC. If the heart beat message is not received by after certain period of time, one server or the local DSC determines that the communication link with the other server or the authoritative DSC has failed. In another embodiment, the local DSC determines that the communication link has failed whenever the authoritative DSC does not respond to an authorization request message for a particular period of time. In this example it shall be assumed that local DSC 914 has detected the failure of communication link 976 with authoritative DSC 916.

At block 1004, the first server identifies associated entities that have been assigned to the authoritative server. For example, the local DSC identifies the entities within its distributed session information that have been assigned the authoritative DSC. For example, local DSC 914 uses the value of authoritative DSC 968 in distributed session information 932 to determine that DSC 916 has been assigned as the authoritative DSC for John.

At block 1006, the first server stores the number of currently active sessions that have been locally authorized in local session count information. For example, local DSC 914 causes the local counters that are associated with the identified entities to reflect only those sessions that have authorized through the local DSC and which are currently active. For example, local DSC 914 causes the value of local session counter 954 to be set equal to the value of local sessions established counter 955.

At block 1008, information about the communication link failure is recorded or stored for subsequent use. For example, by recording that communication link 976 has failed, upon receiving a connection request from John, local DSC can quickly determine that the communication link with authoritative DSC has failed and that authorization is therefore to be performed locally. Likewise, if a connection request is received by the local DSC for an entity that has not previously requested a session, if the entity is assigned to the authoritative DSC the local DSC can determine that the session should be authorized locally without needing to first attempt to communicate with the authoritative DSC.

Authoritative DSC Failover Sequence

Figure 11:
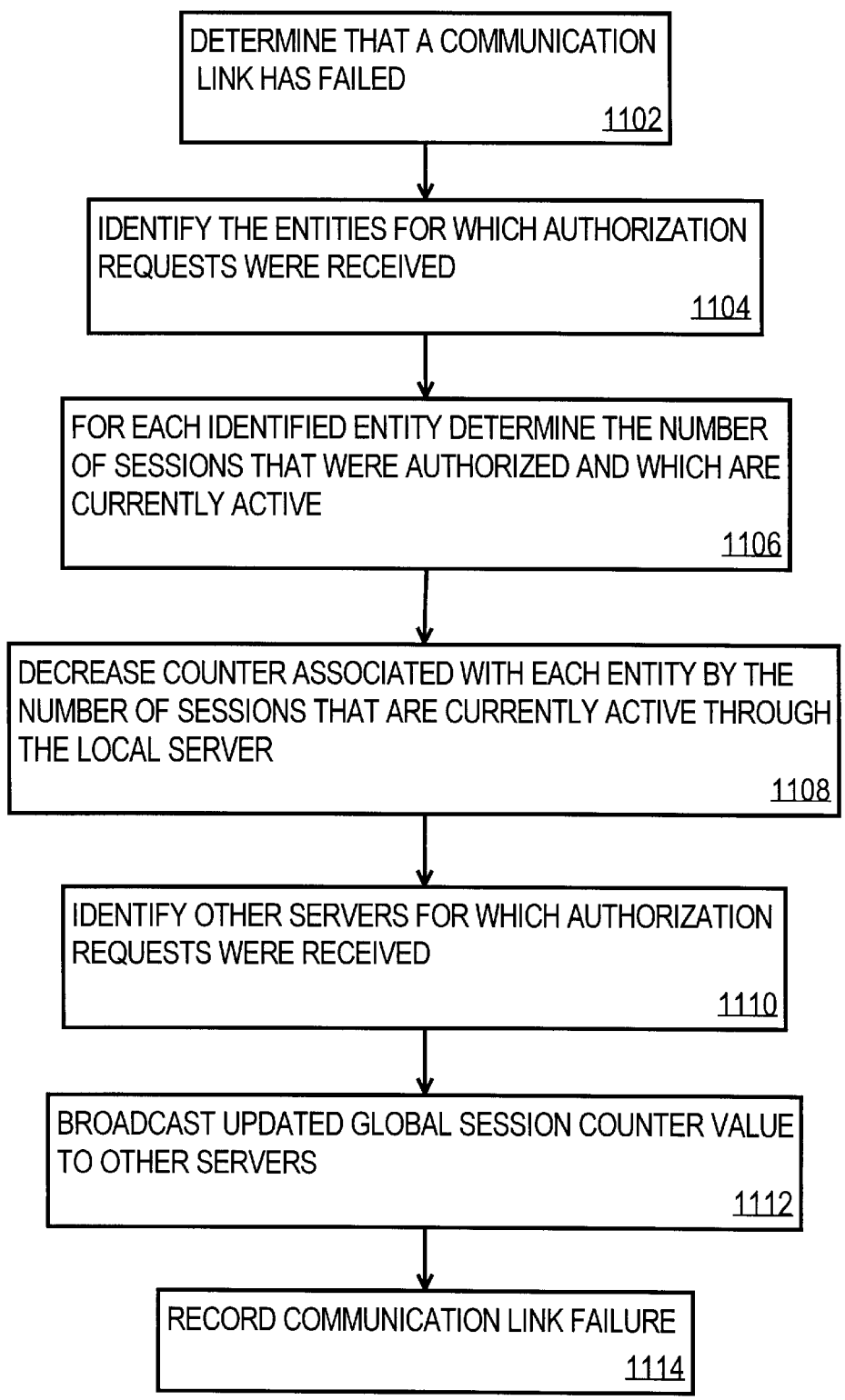
FIG. 11 illustrates a multi-level authorization mechanism that may be used by an authoritative server upon determining that a communication link has failed.

FIG. 11 is flow a diagram that illustrates a method for performing a failover sequence at an authoritative DSC upon determining that a communication link with a local DSC has failed. The steps of FIG. 11 are explained with reference to the system of FIG. 9A, by way of example; however, the process of FIG. 11 may be carried out in any computer system, network or arrangement that involves multiple servers that communicate with one another, or clients and servers that communicate.

At block 1102 a second or authoritative server determines that a communication link with a first server has failed. For example, an authoritative DSC determines that a communication link with a local DSC has failed. As described above for FIG. 10, several methods may be used to determine when a communication link has failed. In this example it shall be assumed that authoritative DSC 916 has detected the failure of communication link 976 with local DSC 914.

At block 1104, the authoritative server identifies associated entities for which authorization requests have been received. For example, authoritative DSC 916 identifies the entities within its global session information for which authorization request messages were received from the local DSC. In the example of FIG. 9A, authoritative DSC 916 uses the value of local DSC list 974 in global session information 928 to determine that an authorization request message was received from local DSC 914 for John.

At block 1106, the authoritative server determines, for each associated entity, the number of current sessions that were authorized. For example, for each entity identified in block 1104, authoritative DSC 916 determines the number of sessions authorized through the local DSC which are currently active. In the example of FIG. 9A, the authoritative DSC 916 uses the value of local DSC list 974 in global session information 928 to determine that one currently active session which was authorized through local DSC 914.

At block 1108, the authoritative server modifies a counter associated with each of the entities by the number of currently locally active sessions. For example, the authoritative DSC decreases the global session counter that is associated with each entity by the number of sessions that were authorized through the local DSC and which are currently active. The authoritative DSC 916 may decrement the value of global session counter 956 by one.

At block 1110, the authoritative server identifies other local servers for which authorization requests were received. For example, the authoritative DSC identifies other local DSCs for which authorization request messages were received for the entities in which the value of the global session counter was decreased. In the example of FIG. 9A using local DSC list 974. DSC 916 identifies DSCs 916 and 918 as other DSCs that have sent authorization request messages for John.

At block 112, the authoritative server sends the updated value to the other servers. For example, the authoritative DSC broadcasts the global session counter update to the identified other local DSCs. In one embodiment, if the authoritative DSC identifies itself as one of the other local DSCs it updates its distributed session information without sending a broadcast message to itself. For examples authoritative DSC 916 broadcasts the updated value of global session counter 956 ("2") to the local DSC 918. In addition authoritative DSC 916 updates the value of local session counter 958 to reflect the updated value of global session counter 956.

At block 1114, the communication link failure is recorded or stored for subsequent use. By recording the communication link failure, the authoritative DSC can quickly determine when a failed communication link has been reestablished. For example, by recording the failure of communication link 976, if a message is received from DSC 914, DSC 916 can quickly determine that communication link 976 is no longer in a failed state and thus take appropriate actions to begin communicating with again with DSC 914.

Although this example illustrates an authoritative DSC detecting, a communication link failure with a local DSC, this sequence of steps can also be used to recover from a local DSC failure. For example, if DSC 914 fails, the steps described in blocks 1102 through 1114 may also be used to continue processing connection requests from John.

In certain embodiments, when a local DSC fails, the one or more NASs that typically request authorization from the failed DSC may instead request authorization from a different DSC. For example, if DSC 914 fails, the NAS 908 may instead request authorization through DSC 916 or DSC 918.

Recovering from an Authoritative DSC Failure

In certain cases, a DSC that has been designated as the authoritative DSC for a particular entity may fail. The previous examples that have been described above for the local DSC failover sequence can be applied to an authoritative DSC failure. For example, if DSC 916 fails, the disconnect policy steps that have been described for DSC 914 may be performed by both DSC 914 and DSC 918 to continue processing connection requests for John. In this case, both DSC 914 and DSC 918 function as if they are the only DSC within the distributed authorization system 900 that may authorize a session to be established for John. Thus, the local session thresholds 946, 952 are no longer used to determine whether a FAST LANE or SLOW LANE authorization is to be performed as all authorization for John is to be performed locally at DSCs 914, 918.

In certain embodiments, when an authoritative DSC fails, the one or more NASs that typically request authorization from the failed DSC may instead request authorization from a different DSC. For example, if DSC 916 fails, the NAS 910 may instead request authorization through DSC 914 or DSC 918.

Restoration After Eliminating a Failure

Once a failure is removed or eliminated, the DSCs re-establish communications with each other. Thereafter, the local DSC reports to the authoritative DSC the number of sessions that it has authorized for a particular entity ("after failure session information"). In one embodiment, the local DSC informs the authoritative DSC only of the sessions that in which it has authorized and that are still active.

Upon receiving the after failure session information, the authoritative DSC updates its global session information to reflect the total number of sessions that are currently active for the particular entity. The authoritative DSC then broadcasts the information to the DSCs that have previously sent authorization requests for the particular entity.

Because over-subscription may have occurred during the failure, the total number of sessions that are currently active for the particular entity may actually exceed the number of sessions that were actually allocated for the particular entity. However, over-subscription is controlled by the number of DSC (groups that are allowed to authorize the allocated number of sessions for the particular entity.

For example, referring to FIG. 9B, when communication link 976 is reestablished, DSC 914 may have authorized 5 sessions for John, and DSCs 916, 918 together may have authorized 5 sessions for John. Thus, although a total of 5 sessions were allocated for John, during the failure, an over-subscription occurred as a total of 10 active sessions were authorized for John. However, as shown in this example, over-subscription is limited to at most 5 additional active sessions for John.

In one embodiment, when an authoritative DSC determines that over-subscription has occurred for an entity, the authoritative DSC denies all authorization requests for that entity. Such denial continues until enough sessions terminate so as to cause the number of active sessions to drop below the number of sessions that were allocated for the particular entity. For example, upon determining that 10 sessions are currently active for John, i.e., the global session counter is "10", the authoritative DSC 916 denies all authorizations requests for John until the value of the global session counter 956 falls below 5.

In certain embodiments, the authoritative DSC may identify one or more sessions to terminate to eliminate over-subscription for the particular entity. Many techniques may be used to determine which sessions should be terminated. For example, the sessions that have been established for the longest period of time may be selected. Alternatively, the sessions that were authorized last may be selected. In another embodiment, the authoritative DSC cannot cause the termination of a session once it is established and therefore is required to wait for one or more sessions to terminate to eliminate the over-subscription.

Hardware Overview

Figure 12:
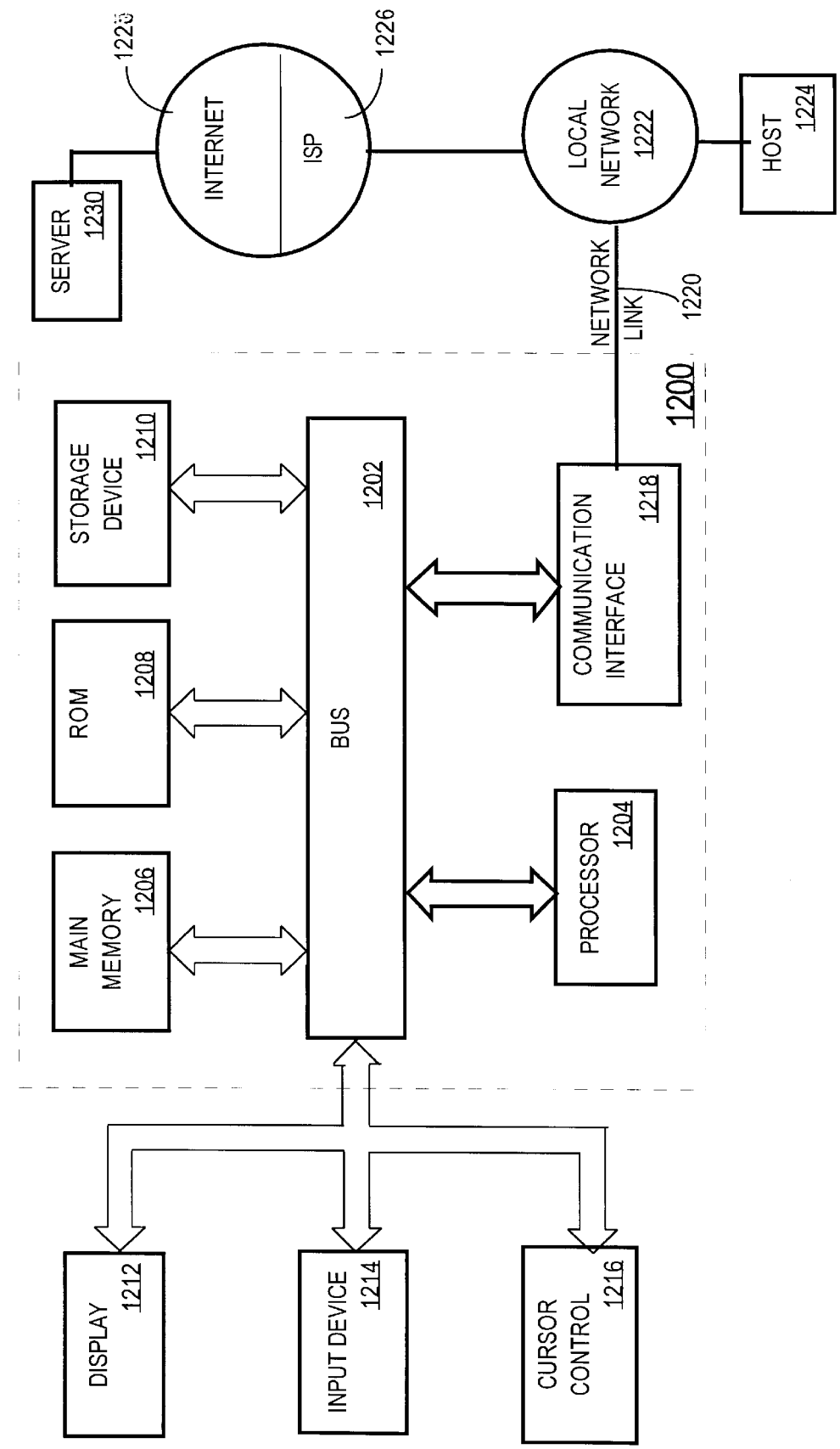
FIG. 12 is a block diagram of a computer system hardware arrangement that can be used to implement aspects of the invention.

FIG. 12 is a block diagram that illustrates a computer system 1200 upon which an embodiment of the invention may be implemented. Computer system 1200 includes a bus 1202 or other communication mechanism tour communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two decrees of freedom in two axes, a first axis (e.g., x) and a second axis (e.g., y), that allows the device to specify positions in a plane.

The invention is related to the use of computer system 1200 for performing a disconnect policy in a distributed computing system. According to one embodiment of the invention, a disconnect policy is performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data Communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and Communication interface 1218. In the Internet example, a server 1230 might transmit a requested code for an application program through Internet 1228, ISP 1226, local network 1222 and communication interface 1218. In accordance with the invention, one Such downloaded application provides for a disconnect policy in a distributed computing system as described herein.

The received code may be executed by processor 1204 as it is received, and/or stored in storage device 1210, or other non-volatile storage for later execution. In this manner, computer system 1200 may obtain application code in the form of a carrier wave.

Alternatives, Extensions

The disconnect policy that is described provides a failover scheme in which local DSCs record the number of active sessions that they have authorized for a particular entity. When communication is lost between the local DSC and the authoritative DSC that is assigned to the particular entity, the local DSC assumes that no other DSCs (local or authoritative) have authorized active sessions for the particular entity. In a similar manner, the authoritative DSC assigned to the particular entity assumes that the local DSC has not authorized any active sessions for the particular entity. When communication is re-established, the local DSC and the authoritative DSC exchange information to recreate the current state. If it is determined that over-subscription has occurred for the particular entity, further authorization requests from the particular entity are denied until the number of active sessions for the particular entity is reduced below an acceptable level. This, failover scheme removes the need for redundant servers and instead distributes the burden of redundancy to the local DSCs, where communication problems are far less likely to occur.

The mechanisms described have applications in many environments in which distributed databases are used to manage a resource. These environments include banking, inventory control, airline/hotel reservation systems, power distribution, and network access control. A disconnect policy provides a mechanism that can be used to control the risk of over-subscription. As implemented, a liberal disconnect policy is used to reflect the willingness to allow over-subscription. Other disconnect policies allow other uses.

For example, in a most conservation policy, a controlled shut-down mechanism does not allow any additional resource usage. Instead, freed resources are keep track of for eventual reconciliation but are not allowed to be re-used. This policy may have applications in mission critical systems, such as medical power distribution, in which a denial is acceptable but a loss of service is not.

In a less conservation policy, a lock-down mechanism does not allow any new resources to be used, but does provide for the recycling of freed resources. This policy may have applications in important systems, such as power distribution and sales inventory, in which over-subscription is expensive but is not catastrophic.

In a first hybrid policy, a lock-down with speculative regeneration mechanism may be provided. In this policy, if local resources have an expected return time, those resources are considered returned after a particular period of time whether or not a confirmation of the return is received. In addition, the policy allows returned resources to be reused. Applications for this policy includes systems in which over-subscription is inconvenient, but tolerable. For example, the hybrid policy may be applied such systems as rental inventory control bandwidth allocation and network access allocation.

In a second hybrid policy, a divide the spoils mechanism is provided in which the disconnected server assumes it has 1/n of the available resources at disconnect time. This policy also allows returned resources to be reused. Applications for this policy include banking systems in addition to those systems described for the first hybrid policy.

In a liberal policy, an open the flood gates mechanism is provided in which the disconnected server assumes that it has all available resources at disconnect time. This policy may have applications in best-effort systems in which over-subscription is inconvenient but preferable to denial. Other mechanisms, such as network access allocation and inventory control of commodity items, can be relied upon to prevent catastrophic overloads.

As described above, the most conservative policy assumes that peers may not have detected the disconnect, may have different policies, or may misbehave. Thus they may continue to allocate resources (even those already allocated by the unreachable server). By not allowing any new resources to be allocated, not only does the disconnected server guarantee it will not over-subscribe, it reduces the possibility that other servers might over-subscribe.

The less conservative policy assumes that peers detect the disconnect and act identically. Each server guarantees that it will not over-subscribe, so the system does not over-subscribe. Any of a resource that was available at loss of connection time is considered unavailable, however, and cannot be allocated by a server that is not connected to the authoritative server.

The first and second hybrid policies integrate assumptions about remote or expected resource allocation behaviors. These allow fuller utilization of resources with a small potential for over-subscription (probably limited to rounding error if policies are evenly applied). The First hybrid policy is riskier than the second hybrid policy in this respect.

The liberal policy makes the most optimistic assumptions possible about expected resource allocation behaviors (everyone else must have returned their resources). This allows for over-subscription of n−1 times (where n is the number of servers in the system). This is the policy implemented in the product we discussed.

In describing certain embodiments of the invention, several drawing figures have been used for explanation purposes. However, the invention is not limited to any particular context as shown in drawing figures, and the spirit and scope of the invention include other contexts and applications in which the distributed authorization model described herein is available to other mechanisms., methods, programs, and processes. For example, the network access servers and the DSCs have been illustrated as separate components. However, in certain embodiments of the invention a network access server and a DSC may function as a single unit. For example, referring to FIG. 1A, the functions described for the network access server 104 and the local DSC 108 may be combined into a single unit. Likewise, the functions of authoritative DSC 112 may be combined with the functions of a network access server in a single unit. Thus, the specification and drawings are, accordingly, to be regarded in an illustrative rather than a restrictive sense.

In addition, in this disclosure, including in the claims, certain process steps are set forth in a particular order, and alphabetic and alphanumeric labels arc used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

-68-

APPENDIX

Copyright © 1998 Cisco Systems, Inc.

1. Purpose

This document defines the protocol that is to be used between the Max Session Server (MSS) and its clients (e.g. another Max Session Server or the Graphical User Interface (GUI)).

2. Terms

| | |
|---|---|
| AAA | Authentication Authorization Accounting, usually used to refer to a AAA server. |
| GUI | Graphical User Interface. |
| MSS | Max Session Server. |
| TLV | Token Length Value – A scheme in which data is sent as three units, a token, a length of data that represents a related value, and that value. Note that for some tokens, a length (and thus value) is not used. Also, the length may be zero, in which case, no value follows. There are also tokens that have fixed length, in which case, data is sent as 2 units, a token and the value. The length of the value with non-fixed length is a 1 byte field. |

3. Background

The Max Session Server resides in the same box as the AAA server. It communicates with other Max Session Servers and the GUI using the protocol presented in this document. All the sample packets that are shown in ASCII format in this document are for the reader to read and understand the protocol easily. The actual protocol is in binary mode, as shown in section 4.2. Note that before the packet is sent, 2 bytes are added in front of the packet to specify the length of the packet.

4. Grammar

*4.1. Syntax*

4.1.1. Statements

Each command to the MSS comprises one or more statements. These statements may run on, but they must eventually be terminated by a ';' (semicolon). The semicolon is considered a synchronization operator. When a semicolon is encountered, the MSS will complete all output to that client before processing any further input from that client. It will also ensure that the level of nesting is zero and that any incomplete commands are aborted.

- Final Statement =>     <zero or more statements> ;

50325-038 APPENDIX
(WGM 579)

4.1.2. Nesting

Nesting is accomplished with braces. An open brace increases the level of nesting, and a close brace decreases the level. The level of nesting can never be less than zero. If unmatched close braces are encountered, an error is assumed.
- Nested Statement =>      { <zero or more statements> }

4.1.3. Setting Statements

A setting command is followed by a value. The format of that value is implied by the setting statement. If the value is an enumeration, it will be expressed as a setting-specific identifier. These words have no meaning other than as a value of a particular type.
- Setting Statement =>      <Setting Command> <number | string | setting-specific identifier>

4.1.4. Command Statements

A command statement is a statement that requests an action, groups requests, replies to a request, or instantiates a counter. A command statement must be followed by an open brace to increase the level of nesting. When the level of nesting is decreased with a matching close brace, the command statement is completed.
- Command statement =>     <Basic Command> <Nested Statement>
  |     <Reply Command> <Nested Statement>
  |     <Counter Command> <Nested Statement>

4.2. Protocol

4.2.1. Operators

4.2.1.1. Synchronization (Statement Terminator)

;     0x00     Synchronize.

4.2.1.2. Nesting

{     0x01     Increase level of nesting.
}     0x02     Decrease level of nesting.

4.2.2. Setting Commands

| | | | |
|---|---|---|---|
| version_num | 0x21 | <num1> | Set the version number for subsequent releases of the MSS that require protocol changes. |
| sequence_num | 0x22 | <num4> | Set sequence number for subsequent commands that require a reply. |
| nas_name | 0x23 | <string> | Set nas address on reservation, cancel_reservation, activation, and termination request packets. |
| nas_port | 0x24 | <string> | Set nas port on reservation, cancel_reservation, activation, and termination request packets. |
| force_acceptance | 0x25 | <true false enum> | Indicate 'true' for fast lane requests and 'false' for slow lane requests for reservations only. |
| Status | 0x26 | <status enum> | Indicate status for reply - pass or |

50325-038 APPENDIX
(WGM 579)

| | | | fail. |
|---|---|---|---|
| counter_name | 0x27 | <string> | Set counter name. The length can be a maximum of 255 bytes. If the actual name is greater than 255 bytes, we'll only send the first 255 bytes. |
| counter_type | 0x28 | <counter type enum> | Set counter type. |
| max_count | 0x29 | <num4> | Set maximum count. |
| hp_threshold | 0x2A | <num4> | Set slow/fast threshold in value. |
| reserve_count | 0x2B | <num4> | Set the current reservation count. |
| active_count | 0x2C | <num4> | Set the current activation count. |
| res_nasname | 0x2D | <string> | Set the reservation nas name for synchronization packets only. |
| res_nasport | 0x2E | <string> | Set the reservation nas port for synchronization packets only. |
| act_nasname | 0x2F | <string> | Set the activation nas name for synchronization packets only. |
| act_nasport | 0x30 | <string> | Set the activation nas port for synchronization packets only. |
| numof_rejects | 0x31 | <num4> | Number of rejections of a counter. |
| numof_oversubscribes | 0x32 | <num4> | Number of oversubscriptions of a counter. |
| high_mark | 0x33 | <num4> | High water mark of a counter. |
| res_timeout | 0x34 | <num4> | Reservation timeout in milliseconds. |
| com_timeout | 0x35 | <num4> | Communication timeout in milliseconds. |
| batch_timeout | 0x36 | <num4> | Batch timeout for advertisements in milliseconds. |
| numof_transactions | 0x37 | <num4> | Total number of transactions. |
| alive_time | 0x38 | <num4> | MSS alive time in seconds. |
| last_reset_time | 0x39 | <num4> | Last reset time in seconds. This is used to calculate the number of transactions per seconds within a certain time. |
| reset_global_stats | 0x3A | <true false enum> | if this is set to true, the last_reset_time will be set to current time and numof_transactions will be set to zero. |
| sub_operation | 0x3B | <suboperation enum> | Set the sub-operation for a query request - all, rejects, oversubscribed. |
| last_counter_name | 0x3C | <string> | The name of the counter that the GUI last received from the MSS. |
| last_counter_type | 0x3D | <counter type enum> | The type of the counter that the GUI last received from the MSS. |
| max_counter_return | 0x3E | <num4> | The maximum number of counters that the GUI wants to receive from the MSS. |
| more_indicator | 0x3F | <true false enum> | Set this to true if there are more counters that the GUI can receive |

50325-038 APPENDIX
(WGM 579)

-71-

| | | | |
|---|---|---|---|
| invalid_counter | 0x40 | \<true false enum\> | from the MSS. Indicate whether the counter is still valid or not. If the counter does not exist, set this to 'false'. |
| reset_type | 0x41 | \<reset type enum\> | Indicate whether to reset just the statistics, the counts, or both in the reset requests. |
| hello_type | 0x42 | \<hello type enum\> | Indicate whether the hello packet is sent as a ping or a clear message. |
| state | 0x43 | \<state enum\> | Indicate the state of the nas is up or down. |
| got_count | 0x44 | \<true false enum\> | Indicate whether the counter was processed by the remote MSS or not. |
| counter_handle | 0x45 | \<num4\> | This counter handle is passed to the MSS by the AAA Server/Resource Manager. The MSS has to keep track of this counter handle so that when it returns back to the AAA Server/Resource Manager, the AAA Server/Resource Manager will know which counter to update in the database. |

4.2.2.1. Enumeration for the setting commands

4.2.2.1.1. Counter Types

| | | |
|---|---|---|
| all | 0 | Counter type all. |
| user | 1 | Counter type user. |
| group | 2 | Counter type group. |
| pop | 3 | Counter type pop. |
| user_pop | 4 | Counter type user pop. |
| group_pop | 5 | Counter type group pop. |
| resource | 6 | Counter type resource. |

4.2.2.1.2. Status

| | | |
|---|---|---|
| pass | 0 | Requests granted. |
| fail | 1 | Requests partially or totally denied. |
| no response | 2 | No response from the remote MSS. |
| not reachable | 3 | Remote MSS is not reachable. |

4.2.2.1.3. True False

| | | |
|---|---|---|
| false | 0 | Request type is false. |
| true | 1 | Request type is true. |

4.2.2.1.4. Sub-operation

| | | |
|---|---|---|
| all | 0 | Query request for all counters. |
| rejects | 1 | Query request for counters with number of rejects > 0. |
| oversubscribes | 2 | Query request for counters with number of oversubscriptions > 0. |
| none | 3 | None of the above. |

50325-038 APPENDIX
(WGM 579)

4.2.2.1.5.Reset Type

| | | |
|---|---|---|
| all | 0 | Reset all counters. |
| counts | 1 | Reset counts only. |
| stats | 2 | Reset stats only. |

4.2.2.1.6.Hello Type

| | | |
|---|---|---|
| ping | 0 | Send a ping message to confirm the connection. |
| clear | 1 | Send a clear message to inform the remote MSS to clear all the counters established by the local MSS. |

4.2.2.1.7.State Type

| | | |
|---|---|---|
| up | 0 | The Nas is up. |
| down | 1 | The Nas is down. |

4.2.2.2.Data Type

- string - It has a variable length. The first byte is the length of the string and the string begins at the second byte. This is not a null terminated string.
- num1 - a 1 byte number. This value is saved as a binary value in the packet.
- num2 - a 2 byte short integer. This value is saved as a binary value in the packet.
- num4 - a 4 byte long integer. This value is saved as a binary value in the packet.
- enum - enumeration specified in section 4.2.2.1. This value is saved as a binary value in the packet.

4.2.3. Commands

4.2.3.1.Basic Commands

| | | | | |
|---|---|---|---|---|
| reservation { | 0x51 | -- | -- | Opens a reservation context. One or more counters can be instantiated within this context. When the context is closed (i.e. unnested) the reply is formed. |
| cancel_reservation { | 0x52 | -- | -- | Opens a cancel reservation context. This context behaves as a reservation context, except that it releases, rather than acquires, reservations. |
| activation { | 0x53 | -- | -- | Opens an activation context. This context behaves as a reservation context, except that it activates previously acquired reservations. |
| termination { | 0x54 | -- | -- | Opens an termination context. This context behaves as a reservation context, except that it terminates (releases) previously activated reservations. |
| getcounts { | 0x55 | -- | -- | Opens a get counts context. This context queries the current values of counters. This operation is sent from one MSS to another. |
| addNgetcounts { | 0x56 | -- | -- | Opens an add and get counts context. This context behaves as a getcounts context, except that if the counters |

50325-038 APPENDIX
(WGM 579)

-73-

| | | | | |
|---|---|---|---|---|
| | | | | don't exist, they will be added to the MSS. This operation is sent from one MSS to another. |
| query { | 0x57 | -- | -- | Opens a query context. This context behaves as a reservation context, except that it queries the current values of counters. This operation is sent from a GUI to a MSS. |
| reset { | 0x58 | -- | -- | Opens a reset context. This context behaves as a reservation context, except that it resets the counter statistics to zero, or the counts, or both the counts and statistics. This operation is sent from a GUI to a MSS. |
| get { | 0x59 | -- | -- | Opens a get context. This context gets the current MSS configurable values. This operation is sent from a GUI to a MSS. |
| set { | 0x5A | -- | -- | Opens a set context. This context sets the current MSS configurable values. This operation is sent from a GUI to a MSS. |
| hello { | 0x5B | -- | -- | Opens a hello context. This context triggers the remote MSS to reply to confirm the connectivity between the MSS' on a ping request, or clears the counts that are established by the MSS that is sending the clear request. |
| advertisement { | 0x5C | -- | -- | Opens an advertisement context. The current state of one or more counters can be described within this context. This is sent by the authoritative MSS. |
| nas_advertisement { | 0x5D | -- | -- | Opens an advertisement context. The current state of the NAS can be described within this context. |
| synchronization { | 0x5E | -- | -- | Opens a synchronization context. If the non-authoritative MSS reestablishes a connection with the authoritative MSS, it will send all the counts that it establishes for the authoritative MSS. |

4.2.3.2. Reply Commands

| | | | | |
|---|---|---|---|---|
| reservation_reply { | 0x61 | -- | -- | Opens a reservation reply context. The current state of one or more counters can be described within this context. It is also bound to information about the success of the initiating reservation command. |
| cancel_reservation_reply { | 0x62 | -- | -- | Opens a cancel reservation reply context. This context behaves as a reservation reply context, except |

50325-038 APPENDIX
(WGM 579)

-74-

| | | | |
|---|---|---|---|
| | | | that it contains information about canceled reservations. |
| activation_reply { | 0x63 | - - | Opens an activation reply context. This context behaves as a reservation reply context, except that it contains information about activated reservations. |
| termination_reply { | 0x64 | - - | Opens a termination reply context. This context behaves as a reservation reply context, except that it contains information about terminated activations. |
| getcounts_reply { | 0x65 | - - | Opens a get counts reply context. It returns the active and reserve counts of each requested counters. This operation is sent from one MSS to another. |
| addNgetcounts_reply { | 0x66 | - - | Opens an add and get counts reply context. It returns the active and reserve counts of each requested counters. This operation is sent from one MSS to another. |
| query_reply { | 0x67 | - - | Opens a query reply context. The current state of one or more queried counters are described within this context. This operation is sent from a MSS to a GUI. |
| reset_reply { | 0x68 | - - | Opens a reset reply context for the stats, the counts, or both. Operation success are described within this context. This operation is sent from a MSS to a GUI. |
| get_reply { | 0x69 | - - | Opens a get reply context. This context returns the current MSS configurable values. |
| set_reply { | 0x6A | - - | Opens a set reply context. This context returns the current MSS configurable values. |
| hello_reply { | 0x6B | - - | Opens a hello reply context. This context confirms the connectivity between the MSS' on a ping request, or confirms that the counters have been cleared on a clear request. |

4.2.3.3. Counter Commands

| | | | |
|---|---|---|---|
| counter { | 0x71 | -- | -- | Opens a counter context. |

5. Required Settings

The following sections define the settings that are required in each request or reply packet based on the enclosing basic and reply command. "Global" settings are the header set commands that are common to all counters in each request or reply packet. "Local"

50325-038 APPENDIX
(WGM 579)

-75- settings are the set commands that are required in each instance of a counter. Each setting in each packet has to follow the same order as shown below.

5.1. reservation, cancel_reservation, activation, termination, getcounts, addNgetcounts

5.1.1. Global settings
- version_num
- sequence_num
- nas_name
- nas_port
- force_acceptance (reservation only)

5.1.2. Local settings
- counter_name
- counter_type
- counter_handle
- max_count
- hp_threshold

5.2. reservation_reply, cancel_reservation_reply, activation_reply, termination_reply, getcounts_reply, addNgetcounts_reply

5.2.1. Global settings
- version_num
- sequence_num
- status

5.2.2. Local settings
- counter_name
- counter_type
- counter_handle
- got_count
- reserve_count
- active_count

5.3. advertisement

5.3.1. Global settings
- version_num
- sequence_num

5.3.2. Local settings
- counter_name
- counter_type if the counter exists :
- reserve_count
- active_count
- max_count
- hp_threshold else if the counter is removed :

50325-038 APPENDIX
(WGM 579)

-76-

- invalid_counter

5.4. nas_advertisement 5.4.1. Global settings
- version_num
- sequence_num 5.4.2. Local settings
- nas_name
- state

5.5. synchronization 5.5.1. Global settings
- version_num
- sequence_num 5.5.2. Local settings
- counter_name
- counter_type
- max_count
- hp_threshold There can be 0 or more number of reservation and activation's nas names and nas ports :
- res_nasname
- res_nasport
- act_nasname
- act_nasport

5.6. query 5.6.1. Global settings
- version_num
- sequence_num if the request is for multiple counters :
- sub_operation
- counter_type if the GUI wants to get the next counter of a specific counter :
- last_counter_name
- last_counter_type This is used to restrict the number of returned counters :
- max_counter_return 5.6.2. Local settings
if request is for a specific counter :
- counter_name
- counter_type
-

50325-038 APPENDIX
(WGM 579)

5.7. query_reply

5.7.1. Global settings
- version_num
- sequence_num if the reply is for multiple counters :
- sub_operation
- counter_type
- more_indicator

5.7.2. Local settings
- counter_name
- counter_type if the counter exists :
- reserve_count
- active_count
- numof_rejects
- numof_oversubscribes
- high_mark else if the counter does not exist :
- invalid_counter

5.8. reset

5.8.1. Global settings
- version_num
- sequence_num

5.8.2. Local settings
- counter_name
- counter_type
- reset_type

5.9. reset_reply

5.9.1. Global settings
- version_num
- sequence_num

5.9.2. Local settings
- counter_name
- counter_type
- status

5.10. get

5.10.1. Global settings
- version_num
- sequence_num
-

50325-038 APPENDIX
(WGM 579)

-78-

5.10.2. Local settings
  no settings required

*5.11. get_reply*

5.11.1. Global settings
- version_num
- sequence_num

5.11.2. Local settings
- res_timeout
- com_timeout
- batch_timeout
- numof_transactions
- alive_time
- last_reset_time

*5.12. set*

5.12.1. Global settings
- version_num
- sequence_num

5.12.2. Local settings
- res_timeout
- com_timeout
- batch_timeout
- reset_global_stats

*5.13. set_reply*

5.13.1. Global settings
- version_num
- sequence_num

5.13.2. Local settings
- status

*5.14. hello and hello_reply*

5.14.1. Global settings
- version_num
- sequence_num

5.14.2. Local settings
- hello_type

6. Example Session

The following are the examples for a reservation request, a reservation reply, and a synchronization packets.

50325-038 APPENDIX
(WGM 579)

-79-

6.1. Verbose Mode

The sample packets that are shown in ASCII format here are for the reader to read and understand the protocol easily.

```
version_num 1
sequence_num 1234
reservation {
nas_name 11.22.33.44
nas_port 90
force_acceptance false
counter {
        counter_name A
        counter_type user
        counter_handle 12345
        max_count 30
        hp_threshold 15
    }
    counter {
        counter_name B
        counter_type group
        counter_handle 23456
        max_count 20
        hp_threshold 13
    }
};
```

```
version_num 1
sequence_num 1234
reservation_reply {
status pass
counter {
        counter_name A
        counter_type user
        counter_handle 12345
        got_count true
        reserve_count 10
        active_count 7
    }
    counter {
        counter_name B
        counter_type group
        counter_handle 23456
        got_count true
        reserve_count 11
        active_count 3
    }
};
```

```
version_num 1
sequence_num 2345
synchronization {
    counter {
        counter_name joe
        counter type user
        max_count 30
```

50325-038 APPENDIX
(WGM 579)

-80-

```
            hp_threshold 12
            res_nasname 11.22.33.44
            res_nasport 90
            res_nasname 11.22.33.55
            res_nasport 91
            act_nasname 22.33.44.55
            act_nasport 92
        }
        counter {
            counter_name peter
            counter_type group
            res_nas_port 11.22.33.66 92
            act_nas_port 22.33.44.66 93
            max_count 25
            hp_threshold 12
            res_nasname 11.22.33.66
            res_nasport 92
            act_nasname 22.33.44.66
            act_nasport 93
        }
    };
```

6.2. Binary Mode

The following is the same exchange as the last example, but it shows the actual datastream. Note that the comments (shown in *[square brackets]*) are not part of the data stream.

5
```
0x21 0x01 [version_num 1]
0x22 0x00 0x00 0x04 0xD2
[sequence_num 1234]
0x51 [reservation {]
0x23 0x0B '1' '1' '.' '2' '2' '.' '3' '3' '.'
'4' '4' [nasname 11.22.33.44]
0x24 0x02 '9' '0' [nasport 90]
0x25 0x00 [force_oversubscription false]
0x71 [counter {]
      0x27 0x01 'A' [counter_name A]
      0x28 0x01 [counter_type user]
      0x45 0x00 0x00 0x30 0x39
[counter_handle 12345]
      0x29 0x00 0x00 0x00 0x1E
[max_count 30]
      0x30 0x00 0x00 0x00 0x0F
[hp_threshold 15]
   0x02 [}]
   0x71 [counter {]
      0x27 0x01 'B' [counter_name B]
      0x28 0x02 [counter_type group]
      0x45 0x00 0x00 0x5B 0xA0
[counter_handle 23456]
      0x29 0x00 0x00 0x00 0x14
[max_count 20]
      0x30 0x00 0x00 0x00 0x0D
```

50325-038 APPENDIX
(WGM 579)

-81-

[hp_threshold 13]
    0x02 [}]
0x02 0x00 [};]

0x21 0x01 [version_num 1]
0x22 0x00 0x00 0x04 0xD2
[sequence_num 1234]
0x61 [reservation_reply {]
0x26 0x00 [status pass]
0x71 [counter {]
    0x27 0x01 'A' [counter_name A]
    0x28 0x01 [counter_type user]
    0x45 0x00 0x00 0x30 0x39
[counter_handle 12345]
    0x44 0x01 [got_count true]
    0x2B 0x00 0x00 0x00 0x0A
[reserve_count 10]
    0x2C 0x00 0x00 0x00 0x07
[active_count 7]
    0x02 [}]
    0x71 [counter {]
        0x27 0x01 'B' [counter_name B]
        0x28 0x02 [counter_type group]
        0x45 0x00 0x00 0x5B 0xA0
[counter_handle 23456]
    0x44 0x01 [got_count true]
    0x2B 0x00 0x00 0x00 0x0B
[reserve_count 11]
    0x2C 0x00 0x00 0x00 0x03
[active_count 3]
    0x02 [}]
0x02 0x00 [};]

0x21 0x01 [version_num 1]
0x22 0x00 0x00 0x09 0x29 [sequence_num 2345]
0x5B [synchronization {]
    0x71 [counter {]
        0x27 0x03 'j' 'o' 'e' [counter_name joe]
        0x28 0x01 [counter type user]
        0x29 0x00 0x00 0x00 0x1E
[max_count 30]
        0x2A 0x00 0x00 0x00 0x0C
[hp_threshold 12]
        0x2D 0x0B '11.22.33.44'
[res_nasname 11.22.33.44]
        0x2E 0x02 '90' [res_nasport 90]
        0x2D 0x0B '11.22.33.55'
[res_nasname 11.22.33.55]
        0x2E 0x02 '91' [res_nasport 91]
        0x2F 0x0B '22.33.44.55'
[act_nasname 22.33.44.55]
        0x30 0x02 '92' [act_nasport 92]
    0x02 [}]
    0x71 [counter {]

50325-038 APPENDIX
(WGM 579)

-82-

```
     0x27 0x05 'peter' [counter_name peter]
     0x28 0x02 [counter_type group]
     0x29 0x00 0x00 0x00 0x19 [max_count 25]
     0x2A 0x00 0x00 0x00 0x0C [hp_threshold 12]
     0x2D 0x0B '11.22.33.66' [res_nasname 11.22.33.66]
     0x2E 0x02 '92' [res_nasport 92]
     0x2F 0x0B '22.33.44.66' [act_nasname 22.33.44.66]
     0x30 0x02 '93' [act_nasport 93]
0x02 [}]
0x02 0x00 [};]
```

7. Sample packets

7.1. Reservation and Reservation Reply

```
version_num 1
sequence_num 1
reservation {
nas_name 11.22.33.44
nas_port 90
force_acceptance false
    counter {
        counter_name A
        counter_type user
        counter_handle 12345
        max_count 30
        hp_threshold 15
    }
    counter {
        counter_name B
        counter_type group
        counter_handle 23456
        max_count 20
        hp_threshold 13
    }
};
```

```
                                        version_num 1
                                        sequence_num 1
                                        reservation_reply {
                                        status pass
                                            counter {
                                                counter_name A
                                                counter_type user
                                                counter_handle 12345
                                                got_count true
                                                reserve_count 10
                                                active_count 7
                                            }
```

-83-

```
                    counter {
                        counter_name B
                        counter_type group
                        counter_handle 23456
                        got_count true
                        reserve_count 11
                        active_count 3
                    }
                };
```

7.2. Cancel Reservation and Cancel Reservation Reply

```
version_num 1
sequence_num 2
cancel_reservation {
nas_name 11.22.33.44
nas_port 90
    counter {
        counter_name A
        counter_type user
        counter_handle 34567
        max_count 30
        hp_threshold 15
    }
    counter {
        counter_name B
        counter_type group
        counter_handle 34568
        max_count 20
        hp_threshold 13
    }
};
```

```
                    version_num 1
                    sequence_num 2
                    cancel_reservation_reply {
                    status pass
                        counter {
                            counter_name A
                            counter_type user
                            counter_handle 34567
                            got_count true
                            reserve_count 10
                            active_count 7
                        }
                        counter {
                            counter_name B
                            counter_type group
                            counter_handle 34568
                            got_count true
                            reserve_count 11
                            active_count 3
                        }
                    };
```

50325-038 APPENDIX
(WGM 579)

7.3. Activation and Activation Reply

```
version_num 1
sequence_num 3
activation {
nas_name 11.22.33.44
nas_port 90
    counter {
        counter_name A
        counter_type user
        counter_handle 11111
        max_count 30
        hp_threshold 15
    }
    counter {
        counter_name B
        counter_type group
        counter_handle 22222
        max_count 20
        hp_threshold 13
    }
};
```

```
version_num 1
sequence_num 3
activation_reply {
status pass
    counter {
        counter_name A
        counter_type user
        counter_handle 11111
        got_count true
        reserve_count 10
        active_count 7
    }
    counter {
        counter_name B
        counter_type group
        counter_handle 22222
        got_count true
        reserve_count 11
        active_count 3
    }
};
```

7.4. Termination and Termination Reply

```
version_num 1
sequence_num 4
termination {
nas_name 11.22.33.44
nas_port 90
    counter {
        counter_name A
        counter_type user
        counter_handle 33333
```

50325-038 APPENDIX
(WGM 579)

-85-

```
            max_count 30
            hp_threshold 15
         }
      counter {
         counter_name B
         counter_type group
         counter_handle 44444
         max_count 20
         hp_threshold 13
      }
};
                                        version_num 1
                                        sequence_num 4
                                        termination_reply {
                                        status pass
                                            counter {
                                                counter_name A
                                                counter_type user
                                                counter_handle 33333
                                                got_count true
                                                reserve_count 10
                                                active_count 7
                                            }
                                            counter {
                                                counter_name B
                                                counter_type group
                                                counter_handle 44444
                                                got_count true
                                                reserve_count 11
                                                active_count 3
                                            }
                                        };
```

7.5. Getcounts and Getcounts Reply

```
version_num 1
sequence_num 5
getcounts {
nas_name 11.22.33.44
nas_port 90
    counter {
        counter_name A
        counter_type user
        counter_handle 55555
        max_count 30
        hp_threshold 15
    }
    counter {
```

50325-038 APPENDIX
(WGM 579)

-86-

```
            counter_name B
            counter_type group
            counter_handle 66666
            max_count 20
            hp_threshold 13
        }
    };
```

```
                                        version_num 1
                                        sequence_num 5
                                        getcounts_reply {
                                        status pass
                                            counter {
                                                counter_name A
                                                counter_type user
                                                counter_handle 55555
                                                got_count true
                                                reserve_count 10
                                                active_count 7
                                            }
                                            counter {
                                                counter_name B
                                                counter_type group
                                                counter_handle 66666
                                                got_count false
                                                reserve_count 0
                                                active_count 0
                                            }
                                        };
```

7.6.  AddNgetcounts and AddNgetcounts Reply

```
version_num 1
sequence_num 6
addNgetcounts {
nas_name 11.22.33.44
nas_port 90
    counter {
        counter_name A
        counter_type user
        counter_handle 77777
        max_count 30
        hp_threshold 15
    }
    counter {
        counter_name B
        counter_type group
        counter_handle 88888
        max_count 20
        hp_threshold 13
    }
};
```

```
                                        version_num 1
                                        sequence_num 6
                                        addNgetcounts_reply {
```

-87-

```
        status pass
            counter {
                counter_name A
                counter_type user
                counter_handle 77777
                got_count false
                reserve_count 0
                active_count 0
            }
            counter {
                counter_name B
                counter_type group
                counter_handle 88888
                got_count true
                reserve_count 11
                active_count 3
            }
    };
```

7.7. Advertisement

```
version_num 1
sequence_num 7
advertisement {
    counter {
        counter_name A
        counter_type user
        invalid_counter true
    }
    counter {
        counter_name B
        counter_type group
        reserve_count 5
        active_count 10
        max_count 20
        hp_threshold 13
    }
};
```

7.8. NAS_Advertisement

```
version_num 1
sequence_num 8
nas_advertisement {
    nas_name 11.22.33.44
    state up
};
```

7.9. Synchronization

```
version_num 1
sequence_num 9
synchronization {
    counter {
        counter_name joe
        counter type user
```

50325-038 APPENDIX
(WGM 579)

-88-

```
            max_count 30
            hp_threshold 12
            res_nasname 11.22.33.44
            res_nasport 90
            res_nasname 11.22.33.55
            res_nasport 91
            act_nasname 22.33.44.55
            act_nasport 92
        }
        counter {
            counter_name peter
            counter_type group
            max_count 25
            hp_threshold 12
            res_nasname 11.22.33.66
            res_nasport 92
            act_nasname 22.33.44.66
            act_nasport 93
        }
};
```

7.10. Query and Query Reply

```
version_num 1
sequence_num 10
query {
    counter {
        counter_name A
        counter_type user
    }
};
```

```
version_num 1
sequence_num 10
query_reply {
    counter {
        counter_name A
        counter_type user
        reserve_count 10
        active_count 7
        numof_rejects 2
        numof_oversubscribes 1
        high_mark 21
    }
};
```

```
version_num 1
sequence_num 11
query {
sub_operation rejects
counter_type user
};
```

```
version_num 1
sequence_num 11
query_reply {
sub_operation rejects
```

50325-038 APPENDIX
(WGM 579)

-89-

```
counter_type user
more_indicator false
    counter {
        counter_name A
        counter_type user
        reserve_count 10
        active_count 7
        numof_rejects 5
        numof_oversubscribes 5
        high_mark 35
    }
    counter {
        counter_name B
        counter_type user
        reserve_count 7
        active_count 8
        numof_rejects 9
        numof_oversubscribes 1
        high_mark 25
    }
    counter {
        counter_name C
        counter_type user
        reserve_count 2
        active_count 10
        numof_rejects 1
        numof_oversubscribes 0
        high_mark 20
    }
    counter {
        counter_name D
        counter_type user
        reserve_count 11
        active_count 11
        numof_rejects 3
        numof_oversubscribes 0
        high_mark 30
    }
    counter {
        counter_name E
        counter_type user
        reserve_count 10
        active_count 7
        numof_rejects 5
        numof_oversubscribes 5
        high_mark 35
    }
};
```

50325-038 APPENDIX
(WGM 579)

-90-

```
version_num 1
sequence_num 12
query {
sub_operation oversubscribed
counter_type all
last_counter_name B
last_counter_type user
max_counter_return 3
};
```

```
version_num 1
sequence_num 12
query_reply {
sub_operation oversubscribed
counter_type all
more_indicator true
counter {
        counter_name C
        counter_type user
        reserve_count 2
        active_count 10
        numof_rejects 0
        numof_oversubscribes 10
        high_mark 40
    }
    counter {
        counter_name D
        counter_type user
        reserve_count 11
        active_count 11
        numof_rejects 3
        numof_oversubscribes 3
        high_mark 30
    }
    counter {
        counter_name E
        counter_type group
        reserve_count 10
        active_count 7
        numof_rejects 5
        numof_oversubscribes 5
        high_mark 35
    }
};
```

7.11. Reset and Reset Reply

```
version_num 1
sequence_num 13
reset {
   counter {
      counter_name joe
      counter_type user
      reset_type stats
   }
}
```

50325-038 APPENDIX
(WGM 579)

-91-

```
        counter {
            counter_name peter
            counter_type group
            reset_type counts
        }
};
```

```
                                        version_num 1
                                        sequence_num 13
                                        reset_reply {
                                            counter {
                                                counter_name joe
                                                counter_type user
                                                status pass
                                            }
                                            counter {
                                                counter_name peter
                                                counter_type group
                                                status fail
                                            }
                                        };
```

7.12. Get and Get Reply

```
version_num 1
sequence_num 14
get {
};
```

```
                                        version_num 1
                                        sequence_num 14
                                        get_reply {
                                            res_timeout 1000 ms
                                            com_timeout 500 ms
                                            batch_timeout 1000 ms
                                            numof_transactions 2000
                                            alive_time 10000 s
                                            last_reset_time 600s
                                        };
```

7.13. Set and Set Reply

```
version_num 1
sequence_num 15
set {
    res_timeout 2000 ms
    com_timeout 1000 ms
    batch_timeout 1000 ms
    reset_global_stats true
};
```

```
                                        version_num 1
                                        sequence_num 15
                                        set_reply {
                                            status pass
                                        };
```

50325-038 APPENDIX
(WGM 579)

-92-

7.14. Hello and Hello Reply

```
version_num 1
sequence_num 16
hello {
    hello_type ping
};
```

```
                                version_num 1
                                sequence_num 16
                                hello_reply {
                                    hello_type ping
                                };
```

```
version_num 1
sequence_num 17
hello {
    hello_type clear
};
```

```
                                version_num 1
                                sequence_num 17
                                hello_reply {
                                    hello_type clear
                                };
```

8. Summary

The TLV binary mode prevents the protocol from being too "chatty" and reduces the amount of time that must be spent parsing input.

50325-038 APPENDIX
(WGM 579)

What is claimed is:

1. A method for performing a disconnect policy that involves authorizing a data communication session between a client and a first server, the method comprising the computer-implemented steps of:

determining that a second server cannot communicate with a third server that is normally responsible for authorizing the session;

receiving a request to establish a session for a particular entity associated with the client;

determining whether the third server is an authoritative server for the entity;

if the third server is the authoritative server for the entity, then determining at the second server whether the session should be established for the entity; and determining to establish the session for the entity only upon determining that a then-current count of sessions maintained only by the second server is less than a total number of sessions that have been allocated for the entity.

2. The method as recited in claim 1, wherein the second server is a local distribution session counter that is non-authoritative in relation to the client and the third server is an authoritative session counter that is authoritative in relation to the client.

3. The method as recited in claim 1, further comprising the steps of:

creating and storing a local session counter value that indicates a first number of active sessions that have been authorized for the particular entity by the second server;

creating and storing a global allocated sessions value that indicates a second number of sessions that have been allocated for the particular entity by the third server; and determining to establish the session for the entity only upon determining that the local session counter value is less than the global allocated sessions value.

4. The method as recited in claim 1, further comprising the steps of storing and maintaining data that is associated with the second server, wherein the data includes, a local session established counter value that indicates a first number of sessions that have been authorized for the particular entity by the second server and which are still currently active; and an allocated sessions threshold value that indicates a second number of sessions that have been allocated for the particular entity.

5. The method as recited in claim 1, further comprising the steps of storing and maintaining data that is associated with the second server, wherein the data includes, a local session counter value that indicates a third number of sessions that are currently active for the particular entity; and a local session threshold value that indicates a fourth number of sessions that may be currently active before sessions cannot be authorized locally by the second server.

6. The method as recited in claim 1, further comprising the steps of storing and maintaining data that is associated with the second server, wherein the data includes an authoritative distribution session counter identifier that identifies an authoritative server that maintains global session information for authorizing sessions for the entity.

7. The method a s recited in claim 1, wherein the step of determining at the second server whether the session should be established for the particular entity comprises the steps of:

determining a local session established counter value that indicates a first number of sessions that have been authorized for the particular entity by the second server and which are still currently active;

determining an allocated sessions threshold value that indicates a second number of sessions that have been allocated for the particular entity; and comparing the local session established counter value with the allocated sessions threshold value to determine whether the session should be established for the particular entity.

8. The method as recited in claim 7, wherein the step of comparing comprises the steps of:

if the value of the local session established counter is less than the value of the allocated sessions threshold then determining that the session should be established.

9. The method as recited in claim 1, further comprising the steps of:

if the third server is not the authoritative server for the entity, then determining whether the session can be locally authorized at a second server;

if authorization of the session can be performed locally at the second server, then informing the first server that the session may be established between the client and the first server for the entity; and informing a fourth server that the session has been authorized to be established for the entity, wherein the fourth server is the authoritative server for the entity.

10. The method as recited in claim 9, further comprising the steps of:

if authorization of the session cannot be performed locally at the second server then, requesting the fourth server to authorize the session between the client and the first server; and informing the first server, based on a response received from the fourth server, whether the session may be authorized.

11. The method as recited in claim 9, wherein the step of determining whether authorization of the session can be performed locally at the second server comprises the steps of:

determining a local session counter value that indicates a third number of sessions that are currently active for the particular entity;

determining a local session threshold value that indicates a threshold as to a fourth number of sessions that may be currently active before sessions cannot be authorized locally by the second server; and comparing the local session counter value with the local session threshold value to determine whether authorization of the session can be performed locally at the second server.

12. The method as recited in claim 1, further comprising the steps of:

prior to determining that said second server cannot communicate with said third server, receiving from the third server a global session threshold value that indicates a fifth number of sessions that have been allocated for the entity; and storing the global session threshold value in a portion of memory that is associated with the second server.

13. The method as recited in claim 1, further comprising the steps of:

after determining that the second server can again communicate with the third server,
sending session information from the second server to the third server,
wherein the session information indicates a sixth number of sessions that have been authorized for the particular entity by the second server and which are currently active.

14. A method for performing a disconnect policy involving authorizing, after a failure, a data communication session between a client and a first server, the method comprising the computer-implemented steps of:
after the failure,
determining that a second server cannot communicate with a third server;
identifying one or more sessions that were authorized by the second server and which are currently active for a particular entity, wherein the third server is assigned as an authoritative server for the particular entity;
calculating a global session counter value that indicates a first number of sessions that are currently active for the particular entity, wherein the global session counter value does not include the one or more sessions that have been authorized by the second server and which are currently active for the particular entity; and
upon receiving a request to authorize a session for the particular entity, determining whether the session should be established by comparing the global session counter value with a global session threshold value, wherein the global session threshold indicates a second number of sessions that have been allocated for the particular entity is associated.

15. A method for performing a disconnect policy involving broadcasting, after a failure, session information to one or more servers, the method comprising the computer-implemented steps of:
after the failure,
determining that a first server cannot communicate with a second server;
identifying one or more sessions that were authorized by the second server and which are currently active for a particular entity, wherein the first server is assigned as an authoritative server for the particular entity;
calculating a global session counter value that indicates a first number of sessions that are currently active for the particular entity, wherein the global session counter value does not include the one or more sessions that have been authorized by the second server and which are currently active for the particular entity;
determining whether one or more other servers have previously authorized sessions for the particular entity; and
if one or more other servers have previously authorized sessions for the particular entity, then informing the one or more other servers of the calculated global session counter value.

16. The method as recited in claim 15, further comprising the computer-implemented steps of:
upon receiving a request to authorize a session for the particular entity from the one or more other servers, determining whether the session should be established by
comparing the calculated global session counter value with a global session threshold value, wherein the global session threshold indicates a second number of sessions that have been allocated for the particular entity.

17. The method as recited in claim 16, wherein the step of receiving the request comprises the step of receiving a connection request that requests authorization to establish a Point-to-Point Protocol session between the client and the first server.

18. The method as recited in claim 15, wherein:
prior to the failure,
maintaining data that is associated with the first server, wherein the data includes
a server list, wherein the server list identifies servers that have previously authorized sessions for the particular entity; and
for each server identified, a session counter value that indicates a third number of sessions that it has authorized and which are currently active for the particular entity.

19. A computer-readable medium carrying one or more sequences of instructions for authorizing, after a failure, a data communication session between a client and a first server, wherein execution of the one or more sequences of instructions by one or more processors causes the one or more processors to perform the steps of:
after the failure,
determining that a second server cannot communicate with a third server;
receiving a request to establish a session for a particular entity, wherein the particular entity is associated with the client;
determining whether the third server is assigned as an authoritative server for the particular entity;
if the third server is assigned as the authoritative server for the particular entity, then
determining at the second server whether the session should be established for the particular entity;
determining to establish the session for the entity only upon determining that a then-current count of sessions maintained only by the second server is less than a total number of sessions that have been allocated for the entity.

20. A computer-readable medium carrying one or more sequences of instructions for authorizing, after a failure, a data communication session between a client and a first server, wherein execution of the one or more sequences of instructions by one or more processors causes the one or more processors to perform the steps of:
determining that a second server cannot communicate with a third server;
identifying one or more sessions that were authorized by the second server and which are currently active for a particular entity, wherein the third server is assigned as an authoritative server for the particular entity;
calculating a global session counter value that indicates a first number of sessions that are currently active for the particular entity, wherein the global session counter value does not include the one or more sessions that have been authorized by the second server and which are currently active for the particular entity; and
upon receiving a request to authorize a session for the particular entity, determining whether the session should be established by
comparing the global session counter value with a global session threshold value, wherein the global session threshold indicates a second number of sessions that have been allocated for the particular entity is associated.

21. A computer-readable medium carrying one or more sequences of instructions for broadcasting, after a failure, session information to one or more servers, wherein execution of the one or more sequences of instructions by one or more processors causes the one or more processors to perform the steps of:

determining that a first server cannot communicate with a second server;

identifying one or more sessions that were authorized by the second server and which are currently active for a particular entity, wherein the first server is assigned as an authoritative server for the particular entity;

calculating a global session counter value that indicates a first number of sessions that are currently active for the particular entity, wherein the global session counter value does not include the one or more sessions that have been authorized by the second server and which are currently active for the particular entity;

determining whether one or more other servers have previously authorized sessions for the particular entity; and if one or more other servers have previously authorized sessions for the particular entity, then informing the one or more other servers of the calculated global session counter value.

22. A computer apparatus comprising:

a processor; and a memory coupled to the processor, the memory containing one or more sequences of instructions for authorizing, after a failure, a data communication session between a client and a first server, wherein execution of the one or more sequences of instructions by the processor causes the processor to perform the steps of:

after the failure, determining that a second server cannot communicate with a third server;

receiving a request to establish a session for a particular entity, wherein the particular entity is associated with the client;

determining whether the third server is assigned as an authoritative server for the particular entity; and if the third server is assigned as the authoritative server for the particular entity, then determining at the second server whether the session should be established for the particular entity; and determining to establish the session for the entity only upon determining that a then-current count of sessions maintained only by the second server is less than a total number of sessions that have been allocated for the entity.

23. A computer apparatus comprising:

a processor; and a memory coupled to the processor, the memory containing one or more sequences of instructions for authorizing, after a failure, a data communication session between a client and a first server, wherein execution of the one or more sequences of instructions by the processor causes the processor to perform the steps of:

determining that a second server cannot communicate with a third server;

identifying one or more sessions that were authorized by the second server and which are currently active for a particular entity, wherein the third server is assigned as an authoritative server for the particular entity;

calculating a global session counter value that indicates a first number of sessions that are currently active for the particular entity, wherein the global session counter value does not include the one or more sessions that have been authorized by the second server and which are currently active for the particular entity; and upon receiving a request to authorize a session for the particular entity, determining whether the session should be established by comparing the global session counter value with a global session threshold value, wherein the global session threshold indicates a second number of sessions that have been allocated for the particular entity is associated.

24. A computer apparatus comprising:

a processor; and a memory coupled to the processor, the memory containing one or more sequences of instructions for broadcasting, after a failure, session information to one or more servers, wherein execution of the one or more sequences of instructions by the processor causes the processor to perform the steps of:

determining that a first server cannot communicate with a second server;

identifying one or more sessions that were authorized by the second server and which are currently active for a particular entity, wherein the first server is assigned as an authoritative server for the particular entity;

calculating a global session counter value that indicates a first number of sessions that are currently active for the particular entity, wherein the global session counter value does not include the one or more sessions that have been authorized by the second server and which are currently active for the particular entity;

determining whether one or more other servers have previously authorized sessions for the particular entity; and if one or more other servers have previously authorized sessions for the particular entity, then informing the one or more other servers of the calculated global session counter value.

* * * * *